United States Patent [19]
Kuroki et al.

[11] Patent Number: 5,960,176
[45] Date of Patent: Sep. 28, 1999

[54] APPARATUS FOR MANAGEMENT OF SNMP/OSI GATEWAYS

[75] Inventors: Tetsuya Kuroki; Hiroki Horiuchi, both of Saitama; Keizo Sugiyama, Tokyo; Sadao Obana, Saitama; Kenji Suzuki, Tokyo, all of Japan

[73] Assignee: Kokusai Denshin Denwa Co., Ltd., Tokyo, Japan

[21] Appl. No.: 08/709,729

[22] Filed: Sep. 9, 1996

[30] Foreign Application Priority Data

Sep. 7, 1995 [JP] Japan ................................. 7-230228

[51] Int. Cl.[6] ............................. G06F 13/38; G06F 15/17
[52] U.S. Cl. ................................ 395/200.53; 395/200.58; 395/200.66
[58] Field of Search ..................... 395/200.01, 200.79, 395/200.53, 200.3, 200.57, 200.8, 200.58, 200.66

[56] References Cited

U.S. PATENT DOCUMENTS 5,742,762  4/1998  Scholl et al. ......................... 395/200.3
5,778,183  7/1998  Filion et al. ........................ 395/200.53

FOREIGN PATENT DOCUMENTS 7-230228  9/1995  Japan ................................. 395/200.79

OTHER PUBLICATIONS

William Stallings SNMP, SNMPv2 and CMIP: The Practical Guide to Network Management Standards; Addison–Wesley Publishing Co.; 50–53, 1993.

DeSouza et al., CMIP/SNMPv1 translation through application level gateways using OSIMIS/SODE platform; pp. 1–16, Nov. 23, 1993.

"Netlabs Offers SNMP/CMIP coexistence", DataTrends Publications, 1–2, Jun. 29, 1993.

*Primary Examiner*—Mark H. Rinehart

[57] ABSTRACT

The gateway apparatus for SNMP/OSI management enables that an SNMP manager manages an OSI management agent, by using a basic conversion of a management operation and a management information between SNMP and CMIP and by using a cache, a replica and a link object.

21 Claims, 25 Drawing Sheets

Fig. 3

Definition Table between OSI and SNMP

```
+ - smi2Translated ( )                            : TRANSLATED (smi2Translated)
! + - smi2TranlatedObjects(3)        : OBJECT
! ! + - smi2alarmRecord(1)                        : CLASS(alarmRecord)
! ! ! + - smi2AlarmRecordTable(1)                 : TABLE
! ! ! ! + - smi2AlarmRecordEntryNumber(1)         : NUMBER
! ! ! ! + - smi2AlarmRecordEntry(2)               : ENTRY
! ! ! ! ! + - smi2AlaRecTableIndex(1)             : INDEX
! ! ! ! ! + - smi2AlaRecFlag(2)                   : FLAG
! ! ! ! ! + - smi2AlaRecLogRecordId(3)            : logRecordId
! ! ! ! ! + - smi2AlaRecLoggingTime(4)            : loggingTime
              :
              :
! ! ! ! ! + - smi2AlaRecCorelatedNotifications(10)   : SIDE-TABLE(2)
              :
              :
! ! ! ! ! + - smi2AlaRecParent(22)                : PARENT
! ! ! ! ! + - smi2AlaRecRowStatus(23)             : ROWSTATUS
! ! ! + - smi2AlaRecCorrelatedNotificationsTable(2)  : TABLE
! ! ! ! + - smi2AlaRecCorrelatedNotificationsNumber(1) : NUMBER
! ! ! ! + - smi2AlaRecCorrelatedNotificationsEntry(2)  : ENTRY
! ! ! ! ! + - smi2AlaRecCorNotTableIndex(1)       : INDEX
! ! ! ! ! + - smi2AlaRecCorNotFlag(2)             : FLAG
! ! ! ! ! + - smi2AlaRecCorNotCorrelatedNotifications(3)  : SIDE-TABLE(3)
```

| | | | | |
|---|---|---|---|---|
| logRecordId | 2.9.3.2.7.3 | SimpleNameType | Y | 00X00-0000 |
| loggingTime | 2.9.3.2.7.59 | LoggingTime | Y | 00X00-0000 |
| managedObjectCLass | 2.9.3.2.7.60 | ObjectClass | N | 0000000000 |
| managedObjectInstance | 2.9.3.2.7.61 | ObjectInstance | Y | 0000000000 |
| eventType | 2.9.3.2.7.14 | EventTypeId | Y | 0000000000 |
| eventTime | 2.9.3.2.7.13 | EventTime | Y | 0000000000 |
| notificationIdentifier | 2.9.3.2.7.16 | NofificationIdentifier | Y | 0000000000 |

Fig. 4

| Management Operation | SNMP | CMIP |
|---|---|---|
| Getting Management Information | GetRequest<br>GetResponse | (M-GETreq) *1<br>(M-GETcnf) *1 |
| Getting Next Item in Management | Get-NextRequest<br>GetResponse | (M-GETreq) *1<br>(M-GETcnf) *1 |
| Setting Management Information *5 | SetRequest<br>GetResponse | (M-GETreq) *2<br>(M-GETcnf) *2<br>M-SETreq *3<br>M-SETcnf |
| Reporting Event occurred in Management Object | Trap | M-EVENTREPORTind *4<br>M-EVENTREPORTrsp |

Notes:

*1: These are sent when cache and replica do not exist.

*2: These are sent when replica does not exist and object is related to structural attribute.

*3: Confirmation Type

*4: Confirmation Type or Non Confirmation Type

*5: SNMP Object to be operated is related to attribute of OSI agent.

Fig. 5

| Management Operation | SNMP | CMIP |
|---|---|---|
| Setting of Management Information *1 (Setting of Managed Object) | SetRequest GetResponse | M-CREATEreq M-CREATEcnf |
| Setting of Management Information *2 (Deletion of Managed Object) | SetRequest GetResponse | M-DELETEreq M-DELETEcnf |
| Setting of Management Information *3 (Indication of Action to Managed Object) | SetRequest GetResponse | (M-ACTIONreq (confirmation type))*4 (M-ACTIONcnf)*4 |

Notes:

*1 : RowStatus is SNMP object to be operated and creatAndGo is value to be set.

*2 : RowStatus is SNMP object to be operated and destroy is value to be set.

*3 : ActionTrigger and ActionInfoArg are SNMP object to be operated.

*4 : ① Objects in which value is set are ActionTrigger and ActionInfoArg. OR,
② Object is only ActionTrigger, and ActionInfoArg is not defined or of which value has been set.

Reception of SetRequest from SNMP Manager

Reception of M-EVENTREPORTind from OSI Agent

Reception of M-EVENTREPORTind from OSI Agent

Fig. 22

```
CMISFilter ::= CHOICE {
        item  [8] FilterItem
        and   [9] IMPLICIT SET OF CMISFilter
        or    [10] IMPLICIT SET OF CMISFilter  }
```

Fig. 23

```
    Complex - Complex
    Complex - MultiComplex
    MultiComplex - MultiComplex
    MultiComplex - Complex - Complex
    MultiComplex - Complex - MultiComplex
*  Complex = SEQUENCE or SET or CHOICE
*  MultiComplex = SEQUECNCE OF or SET OF
*    . MultiComplex - Complex pattern is spread as one step.
```

Fig. 24

ASN.1 Definition of Link Object

```
LinkObject ::= SEQUENCE OF SEQUENCE {
    index   INTEGER,
    child   SEQUENCE OF LinkObject OPTIONAL }
*   index: value of index, child: hierarchy
    Optional: applied at last step
```

Fig. 27

Attribute "WeekMask" of OSI management object definition is converted and related to SNMP object which has three steps side table structure.

*SET OF SEQUENCE is spread as one step.

```
WeekMask ::= SET OF SEQUENCE {    -- first setp
             daysOfWeek    BIT STRING {
                           sunday(0)   monday(1)   tuesday(2)
                           wednesday(3) thursday(4) friday(5)
                           saturday(6) }
             intervalsOfDay IntervalsOfDay
          }
IntervalsOfDay ::= SET OF SEQUENCE {   -- Second step
             intervalStart  Time24
             intervalEnd    Time24 }
Time24 ::= SEQUENCE {   -- third step
             Hour           INTEGER
             minute         INTEGER }
```

Fig. 28

List-Type

Entry ::= SEQUENCE {
        object type (1),
        object type (2),
        ⋮
        object type (N)
}

Fig. 29

Table-Type

Table ::= SEQUENCE OF { Entry } interface group (SNMP)

(CMIP)

(IIMC)

APPARATUS FOR MANAGEMENT OF SNMP/OSI GATEWAYS

FIELD OF THE INVENTION

This invention relates to a gateway apparatus for SNMP/OSI management. More especially, this invention relates to a gateway apparatus for converting management operations and management information to enable management of an OSI management agent by an SNMP manager. The SNMP manager is a manager having a network management protocol so-called SNMP as an interface, and the OSI management agent is an agent having a network management protocol for OSI management so-called CMIP as an interface.

BACKGROUND OF THE INVENTION

In a telecommunication network, a network management is necessary. The network management is executed by operations for getting a value of a management object item, for setting value of a management object item, and for reporting an event. For this purpose, a message is transferred between a manager and an agent based on a predetermined network management protocol. The manager is a module for managing, the agent is a module to be managed.

The manager commands an operation for a managed information to the agent. The manager interacts with an operator through an interface and, if necessary, stores and analyzes the managed information and an event transferred from the agent.

The agent operates a managed item according to the command from the manager and sends its result to the manager. The agent detects an accident and a change of a status, and sends them as the event to the manager.

As network protocols, SNMP and CMIP are mainly used. SNMP is a "Simple Network Management Protocol" and CMIP is a "Common Management Information Protocol".

A management information in SNMP agent is a gathering of management object items. Then, the management information seems to be a virtual database and it is called as MIB (Management Information Base).

It is necessary to define an ID name of the management object items of SNMP and an MO (Managed Object) of CMIP and also to define a syntax of a value, for accessing the management object items of SNMP or the MO of CMIP. However there is a difference of a definition between SNMP and CMIP.

SNMP is a network protocol used in the Internet, then it is a defacto standard for monitoring and controlling a device in LAN (Local Area Network). A specification of SNMP is prescribed by documents such as RFC (Request For Comments) 1157, under IETF (Internet Engineering Task Force) of IAB (Internet Activities Board). SNMP is more simple in management operation and management information than CMIP.

There are five management operations in SNMP for simplicity as follows (1)~(5).

(1) Get-Request: Request for getting a management object information (2) Get-NextRequest: Request for getting an item next to the management object information (3) Set-Request: Request for setting a management object information (4) Get-Response: Response to any one of above-mentioned request (5) Trap: Report for an event occurred in the agent The management information in SNMP is defined by SMI (Structure of Management Information) standardized by RFC 1155 etc..

Namely, in SNMP, one Object Name is assigned to one management object item based on an object registration tree. As syntax of a value of the management object item, for simplicity, only simple types (INTEGER-type, OCTET STRING-type, OBJECT IDENTIFIER-type and NULL-type) are allowed to use out of data-types in ASN.1 (Abstract Syntax Notation One).

There is a so-called entry in SMI of which concept is a group of management object items. As shown in FIG. 28, SEQUENCE-type in ASN.1 is used for a syntax of the entry which is called as a list-type. However, all components defined in the list-table must be included within data and a data-type of each component must be one of above-mentioned simple-types.

Furthermore, as shown in FIG. 29, SEQUENCE OF-type is used only when the SEQUENCE OF-type indicates a table of the entry, then the SEQUENCE OF-type is called as a table-type. An n-th entry of the table-type is identified by using "n" as an index for discriminating other entries.

In a case to get or set a value of a certain management object item in SNMP, if the management object item is a component of an entry, an operation such as "GetRequest" is done by using an index for discriminating the entry in its table, for example, by designating its object name and [.n], wherein "n" indicates its order in the table. In the case to operate a management object item "ifIndex(1)" in an entry "ifEntry(1)" shown in FIG. 30, [1.3.6.1.2.1.2.2.1.1.n] is designated by using its object name [1.3.6.1.2.1.2.2.1.1] and its index [.n] in the table-type.

Namely, in the management operation of SNMP, it is impossible to operate all over the entries or it is impossible to operate all values of the list-type by one operation. Also, it is impossible to operate the table itself.

On the other hand, in a case to get or set a value of a management object item which is independent from the entry, an operation such as "GetRequest" is done by using an index [0] which indicates that the item is not included within the entry, for example, by designating its object name and [.0]. In the case to operate a management object item "ifNumber(1)" shown in FIG. 30, [1.3.6.1.2.1.2.1.0] is designated.

In addition to above-mentioned four simple types, in SNMP, six data-types are defined. They are [Networkaddress],[IpAddress], [Counter],[Gauge], [TimeTicks] and [Opaque].

The Opaque-type is used for transferring, between the agent and the manager, an arbitrary data which is encoded by an encoding rule of AS N.1 (for example, BER (Basic Encoding Rule)) and which is supposed to be OCTET STRING-type.

FIG. 31 shows a network management system which monitors and controls LAN devices by using SNMP. In FIG. 31, an SNMP manager 100 is a workstation or a personal computer having an SNMP interface 101. The SNMP manager 100 is connected to an SNMP agent 200. The SNMP agent 200 has an SNMP interface 201, but the SNMP interface 201 is installed in a LAN device 300 on a network. 202 denotes an MIB for LAN device 300 under management of the SNMP agent 200.

CMIP is a protocol for managing a network and a system in OSI (Open System Interconnection) based on ISO (International Standard Organization). CMIP is prescribed by ISO/IEC 9596-1 etc..

In TMN (Telecommunication Management Network) standardized by ITU-CMIP and GDMO (Guidelines for the Definition of Managed Object: ISO/IEC 10165-4) are used for monitoring and controlling a telecommunication network.

Function of CMIP is higher and more complex than SNMP in management operation and in managed information. Further, GDMO is more complex than SMI.

There are seven management operations in CMIP as follows (1)~(7) in a general classification. In each operation, there are four modes of "req" (request: for example, M-GETreq), "ind" (indication: for example, M-EVENTREPORTind), "rsp" (response: for example, M-EVENTREPORTrsp) and "cnf" (confirmation: for example, M-GETcnf).

(1) M-GET: Request for getting an attribute of a managed object (2) M-SET: Request for setting an attribute of a managed object (3) M-CREATE: Creation of a managed object (4) M-DELETE: Deletion of a managed object (5) M-ACTION: Instruction of an action to a managed object (6) M-EVENTREPORT: Report for an event occurred in a managed object (7) M-CANCEL-GET: Cancellation of a preceding M-GETreq Managed information of CMIP is prescribed by GDMO. Namely, a management object in OSI management is called as Managed Object, it is deferent from SNMP that Managed Object is expressed by a Managed Object (MO) class and an object instance.

It is possible for Managed Object to have arbitrary numbers of Attributes, and it is possible to definite an action which Managed Object can take and an event which can occur in Managed Object.

As a sample of the Attributes in a printer, there are a name, a type, an interface, a number of sheets in a period. As a sample of the actions, there are a self-test and mode-conversion. As a sample of the events, there are a lack of toner and a jam of a paper.

A group of Managed Objects having same attribute or same action is called as Managed Object Class. Each instance of a Managed Object in a Managed Object Class is called as an object instance.

An object of the management operation by CMIP is the object instance. In CMIP, it is possible to get or set all of the values of the attribute of the object instance at once, by designating an MO class and an object instance.

As mentioned-above, because the object instance is a managed object in a certain managed object class, it is possible to have arbitrary numbers of attributes and it is possible to use all of simple and structural data-types of ASN.1.

FIG. 32 shows a network managing system which monitors and controls TMN devises (devices based on TMN) by using CMIP. In FIG. 32, an OSI manager 400 is a manager having a CMIP interface 401. The OSI manager 400 is connected to an OSI management agent 500. The OSI management agent 500 has an CMIP interface 501, but the CMIP interface 501 is installed in a TMN device 600. 502 denotes an MIB for TMN device 600 under the management of the OSI management agent 500.

Recently, because of a progress of a standardization in TMN, TMN devices having CMIP are introduced into telecommunication carriers. SNMP is widely used in LAN devices and is introduced into many workstations. Further, there are personal computers having a function of SNMP manager.

Therefore, it is necessary to be able to monitor and control TMN devices by using cheap and simple SNMP manager 100, because OSI manager 400 is expensive and complex. For example, if possible, it is useful that user's SNMP manager 100 monitors and controls TMN device 600 for CNM (Customer Network Management). In CNM, it is released for a user to control a telecommunication network of a telecommunication carrier. In CNM, such information of an obstacle or a performance of the telecommunication network are supplied to the user.

However, in the prior art, it was impossible to manage OSI management agent 500 of TMN device 600 by SNMP manager 100 because CMIP is more complex than SNMP in protocol and management information.

IIMC system is considered as a method which manages TMN device by SNMP manager, wherein IIMC denotes ISO/CCITT and International Management Coexistence in NMF (Network Management Forum).

In the IIMC system, as shown in FIG. 33, OSI management agent 500 for TMN device 600 and SNMP agent 700 are simultaneously used. Further more, the SNMP agent 700 has a definition conversion part 702 which converts a definition of the CMIP management information to a definition of the SNMP management information. The SNMP manager 100 manages the SNMP agent 700, then monitors and controls the TMN device 600. 701 denotes an SNMP interface.

Therefore, in the IIMC system, a rule of relationship between MIB 502 of OSI management and MIB of SNMP is prescribed.

As mentioned-above, MO class and attribute are defined as a management information of OSI management by the GDMO.

In the IIMC system, each management object class in GDMO of OSI management corresponds to a table and an entry of SNMP, and each attribute in GDMO of OSI management corresponds to component in the entry of SNMP (management object item).

However, in a case of correspondence to an attribute of a structural type, a syntax of the structural type is divided to plural objects of simple types by using a pointer, a side-table and an entry because structural types (SEQUENCE-type, CHOICE-type etc.) can not be used in SNMP. The pointer indicates a connection to a table, the side-table indicates a member gathering of attributes of structural type.

For example, if A::=SEQUENCE {an INTEGER, b INTEGER, c INTEGER} wherein "A" denotes a syntax of an attribute in an object instance of certain MO class, "A" is allocated to the pointer, the side-table and the entry. Members a, b, c are respectively allocated to a management object item of SNMP. Namely, three management object items are defined as components of the entry.

If M-ACTION is defined in MO class, ActionInfoArg and ActionTrigger are defined as management object items in SNMP. Namely, ActionInfoArg and ActionTrigger are defined as components of an entry corresponding to the MO class. If creation or deletion of an object instance is defined, RowStatus is defined as a management object item in SNMP. Namely, RowStatus is as a component of an entry corresponding to the MO class.

However, IIMC system can not be used, if it is difficult to add to the TMN device 600 such functions of correspondence between the definition of the management information in OSI management and the definition of the management information in SNMP.

Furthermore, a load of the TMN device 600 increases in IIMC system, because the TMN device 600 supplies OSI management agent 500 and the interface 701 of the SNMP agent 700. Therefore, a service originally supplied by OSI management agent 500 may be degraded.

An object of the present invention is to provide a gateway apparatus for SNMP/OSI management which is different from the TMN agent, and is able to manage the OSI management agent by the SNMP manager, by converting the management operation and the management information.

SUMMARY OF THE INVENTION

In the present invention which attains the above object, there is provided a gateway apparatus for SNMP/OSI management which comprises:

SNMP protocol process means for giving and receiving a message by a simple network management protocol (SNMP) to/from an SNMP manager having the SNMP protocol as an interface, and for producing and analyzing a protocol data unit;

OSI protocol process means for giving and receiving a message by a common management information protocol (CMIP) to/from an OSI management agent having the OSI protocol as an interface, and for producing and analyzing a protocol data unit;

table means for determining a correspondence between a definition of a management information of OSI management and a definition of a management information of SNMP management;

instance information means for keeping a name tree of the OSI management agent;

conversion means for converting a management operation and the management information between the SNMP and OSI, said conversion means being connected with said SNMP protocol process means, said OSI protocol process means, said table means and said instance information mean;

wherein said SNMP manager being to able to manage said OSI management agent.

Further, the present invention comprises at least one of below mentioned (1)–(20) items.

(1) instance management means for renewing the name tree kept by said instance information means based on a result of the analysis by said OSI protocol process means.

(2) said conversion means having cache means corresponding to every SNMP manager; when an attribute value is a structural type, said value being kept in said cache means of said conversion means, wherein said value being obtained by issuing a management operation of M-GETreq; when a request of the SNMP manager is to obtain a management information corresponding to the attribute kept in the cache, the attribute value in the cache is transferred.

(3) when the request of the SNMP manager is not to obtain a management information corresponding to the attribute kept in the cache, a content in the cache is deleted.

(4) when the request of the SNMP manager is to set a management information, a content in the cache is deleted.

(5) when an association between the OSI management agent and the gateway apparatus for SNMP/OSI management is disconnected, all content in all cache are deleted.

(6) said conversion means having replica means; a copy of an attribute value is set in the replica, wherein said value being obtained by issuing a management operation of M-GETreq; when a request of the SNMP manager is to set a management information corresponding to the attribute value in the replica, a management operation M-SETreq is issued for changing a value of the requested part and for setting it as a management information in the OSI management agent; when a request of the SNMP manager is to obtain a management information corresponding to the attribute value in the replica, the attribute value in the replica is transferred.

(7) said attribute value is copied according to a request, an existence of said request being stored in said definition table.

(8) when an association between the OSI management agent and the gateway apparatus for SNMP/OSI management is disconnected, all content in the replica are deleted.

(9) plural copies being allowed in the replica, wherein the oldest copy are deleted when a number of the copy is more than the maximum.

(10) said oldest copy is periodically deleted based in a timer by said conversion means.

(11) said conversion means having link object means; when a structural attribute of the management information of the OSI management agent is accessed, a structural data being generated as link object and said structural data being transferred as OPAQUE-type data to the SNMP manager, wherein said structural data represents a table structure which is converted and spread as a management information of SNMP from the structural attribute of the management information of OSI management and which includes a status of the table, index which can be used in the table, and a class structure of the table.

(12) said link object being independently set in every management object class of OSI management information.

(13) said definition table includes an OPAQUE-type of SNMP management information item which is converted as SNMP management information definition from OSI management information definition by using OPAQUE-type.

(14) an attribute type of the OSI management information being a structural type, wherein when a type is recursively defined in components included in said structural type, said attribute is an OPAQUE-type of a single SNMP management information item.

(15) an attribute type of the OSI management information being a structural type, wherein when a number of a step of a side table made by spreading the structural type is more than a predetermined number, said attribute is an OPAQUE-type of a single SNMP management information item.

(16) said definition table includes, as an SNMP management information item to be converted, an object representing a number of instance in managed object of OSI management.

(17) said definition table includes, as an SNMP management information item to be converted, an object representing an existence of a conditional attribute in the OSI management information definition.

(18) said definition table includes, as an SNMP management information item to be converted, an object representing an existence of an optional component in an attribute of SEQUENCE-type or SET-type in the OSI management information definition.

(19) said definition table includes, as an SNMP management information item to be converted, an object representing a selection information of a component in an attribute of CHOICE-type in the OSI management information definition.

(20) said definition table includes, as an SNMP management information item to be converted, an object representing a repetition number of a component in an attribute of SEQUENCE OF-type or SET OF-type in the OSI management information definition.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood by the accompanying drawings which are given by way of illustration only, and thus are not limitative of the present invention, and wherein:

FIG. 3 shows one part of a definition table;

FIG. 4 shows a conversion of a management operation;

FIG. 5 shows a conversion of a management operation;

FIG. 22 shows a single SNMP object of OPAQUE-type;

FIG. 23 shows a pattern of attribute to be converted to OPAQUE-type when two or more steps are limited;

FIG. 24 shows ASN.1 definition of a link object;

FIG. 27 shows ASN.1 definition of the attribute WeekMask shown in FIG. 25;

FIG. 28 explains a list-type;

FIG. 29 explains a table-type;

DETAILED DESCRIPTION OF PREFERRED EMBODIMENTS

Figure 1:
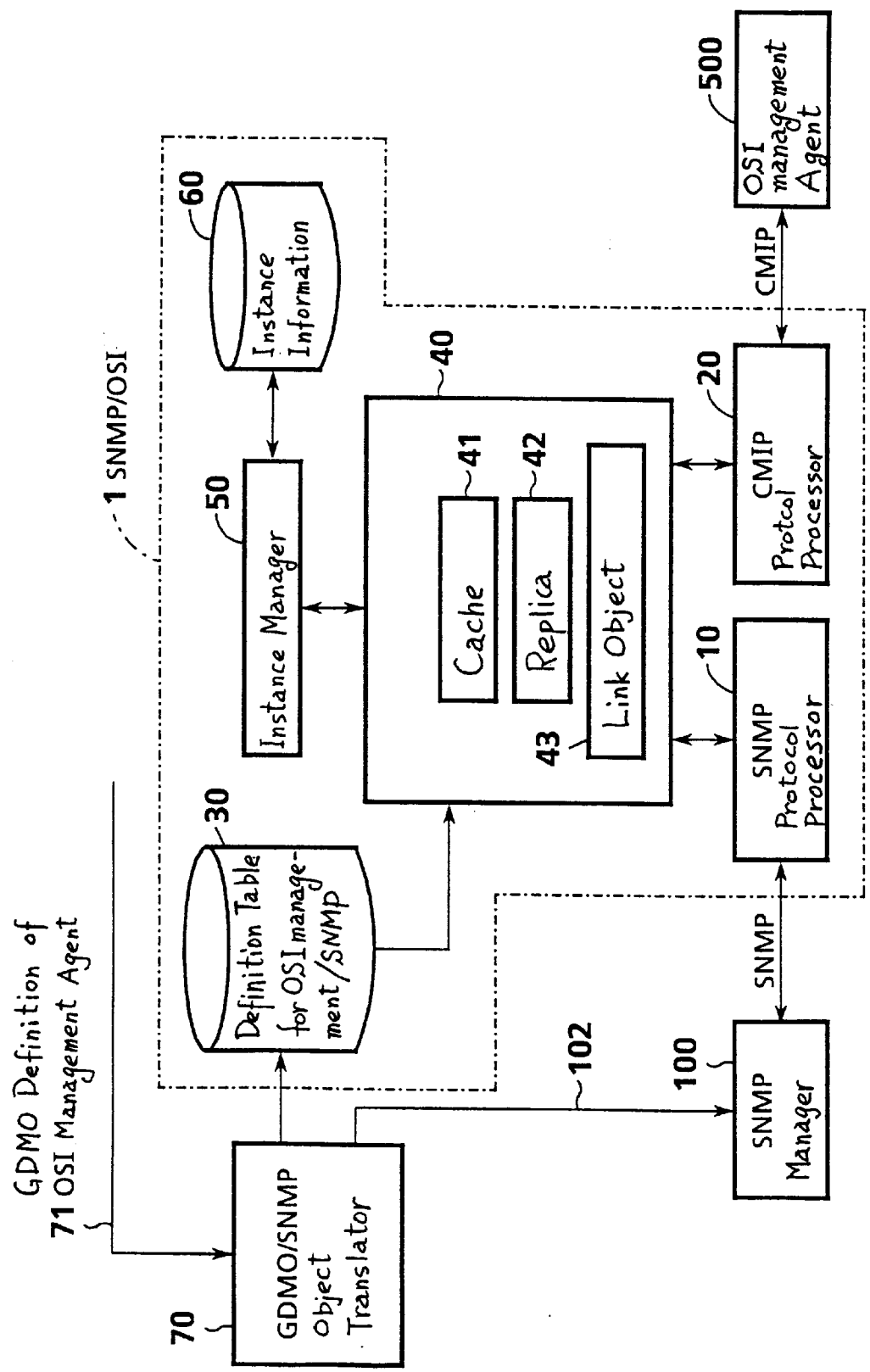
FIG. 1 shows a configuration of a gateway apparatus for SNMP/OSI management.

An embodiment of the present invention will be explained referring to the drawings.

Figure 31:
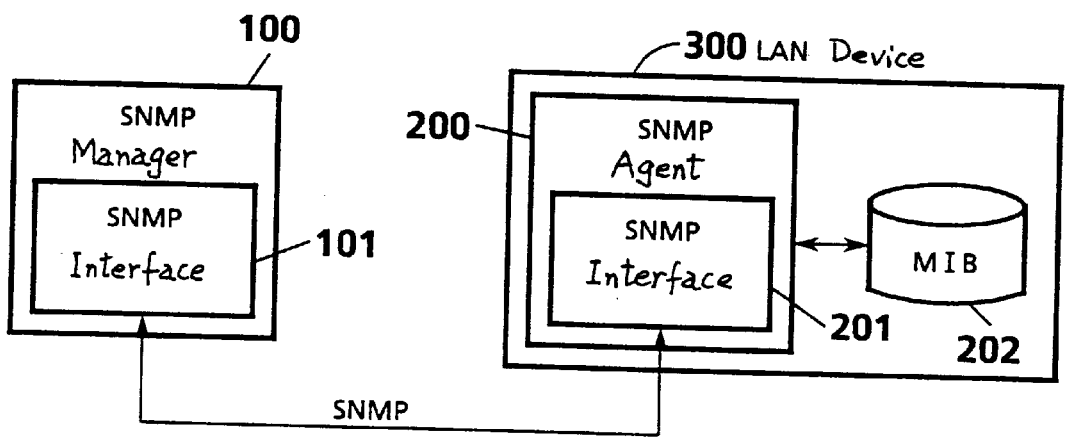
FIG. 31 shows a prior art system in which SNMP manager manages SNMP agent.
Figure 32:
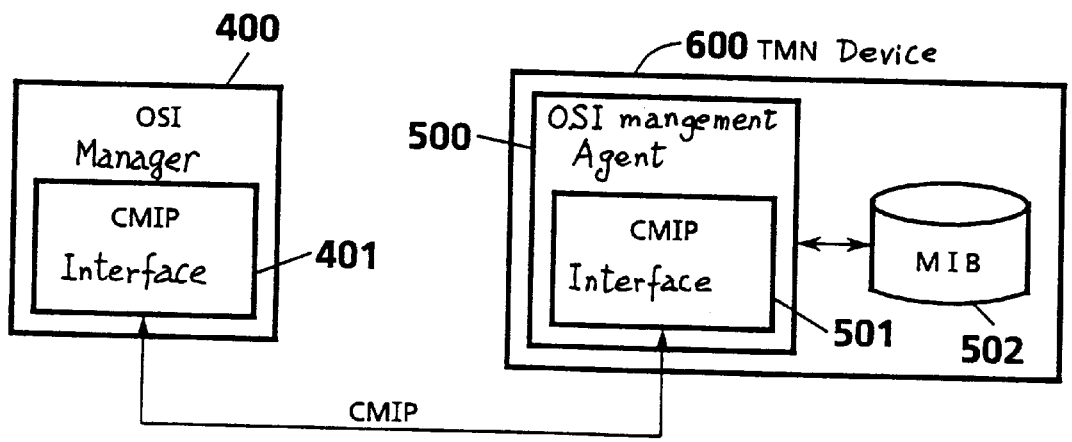
FIG. 32 shows a prior art system in which SNMP manager manages OSI management agent.
Figure 33:
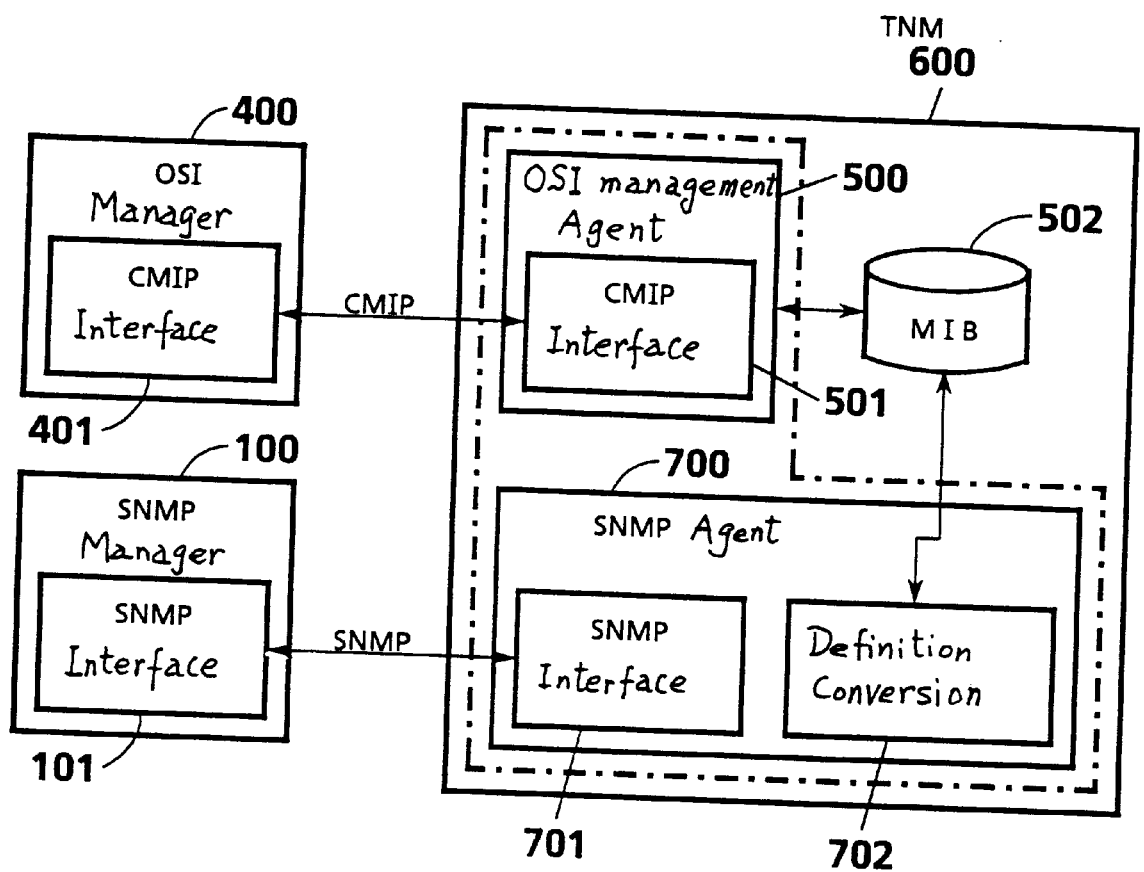
FIG. 33 shows a prior art IIMC system by NMF.

In FIG. 1, a configuration of a gateway apparatus for SNMP/OSI management is shown. The gateway apparatus comprises SNMP protocol process means 10, OSI protocol process means 20, table means 30 for determining a correspondence between a definition of a management information of OSI management and a definition of a management information of SNMP management, conversion means 40 for converting a management operation and the management information, instance management means 50 and instance information means 60. In FIG. 1, 100 denotes the SNMP manager which has the interface 101 of SNMP protocol as shown in FIG. 31 or in FIG. 33, 500 denotes the OSI management agent which has the interface 501 of OSI management protocol and which monitors and controls the TMN device 600 as shown in FIG. 32 or in FIG. 33, further, 70 denotes an object translator converting GDMO of OSI management to the definition of SNMP management information.

SNMP protocol process means 10 gives and receives a message by SNMP (Simple Network Management Protocol) to/from the SNMP manager 101 such as a workstation. SNMP protocol process means 10 analyzes a protocol data unit sent from the SNMP manager 100 and sends a result of the analysis (a management operation, an object name with an index, value and etc. of SNMP) to the conversion means 40. SNMP protocol process means 10 produces a PDU (Protocol Data Unit) from data (a management operation, an object name with an index, value, an event of an agent and etc. of SNMP) given by the conversion means 40, and sends the PDU to the SNMP manager.

OSI protocol process means 20 gives and receives a message by CMIP (Common Management Information Protocol) to/from the OSI management agent 500 in the TMN device. OSI protocol process means 20 produces a PDU from data (a management operation, a class and an object instance of managed object (MO), value and etc. of CMIP) given by the conversion means 40, and gives the PDU to the OSI management agent 500. OSI protocol process means 20 analyzes a PDU from the OSI management agent 500, and sends the result of the analysis (a management operation, a class and an object instance of managed object (MO) and value of CMIP) to the conversion means 40.

Table means 30 determines a correspondence between a definition of a management information GDMO of OSI management and a definition of a management information of SNMP management. The table means includes following information (1)~(5).

(1) a definition of a management information item of SNMP of which correspondence has been determined.

(2) an MO (Managed Object) class and its object identifier of OSI management which relates to the correspondence.

(3) an assortment (for example, attribute, pointer, creation, deletion, action, etc.) corresponding to the GDMO of SNMP management information item.

(4) a syntax of attribute.

(5) necessity or unnecessity of producing a replica.

The table means 30 are used so as not to install, as a program of the gateway apparatus itself, informations deferent from each other of every MO class into the gateway apparatus and so as to separately manage the informations, then it is possible to easily or flexibly meet to the change of the OSI management GDMO in the TMN device.

Further as shown in FIG. 1, the definition table 30 is automatically generated from the OSI management GDMO 71 for the TMN device by using the object translator 70. At the same time, the definition 102 of the SNMP management information is also automatically generated from the TMN device GDMO 71 by using the translator 70 and the definition is given to the SNMP manager 100, wherein the definition 102 is necessary for SNMP manager 100 to access to the gateway apparatus.

Figure 2:
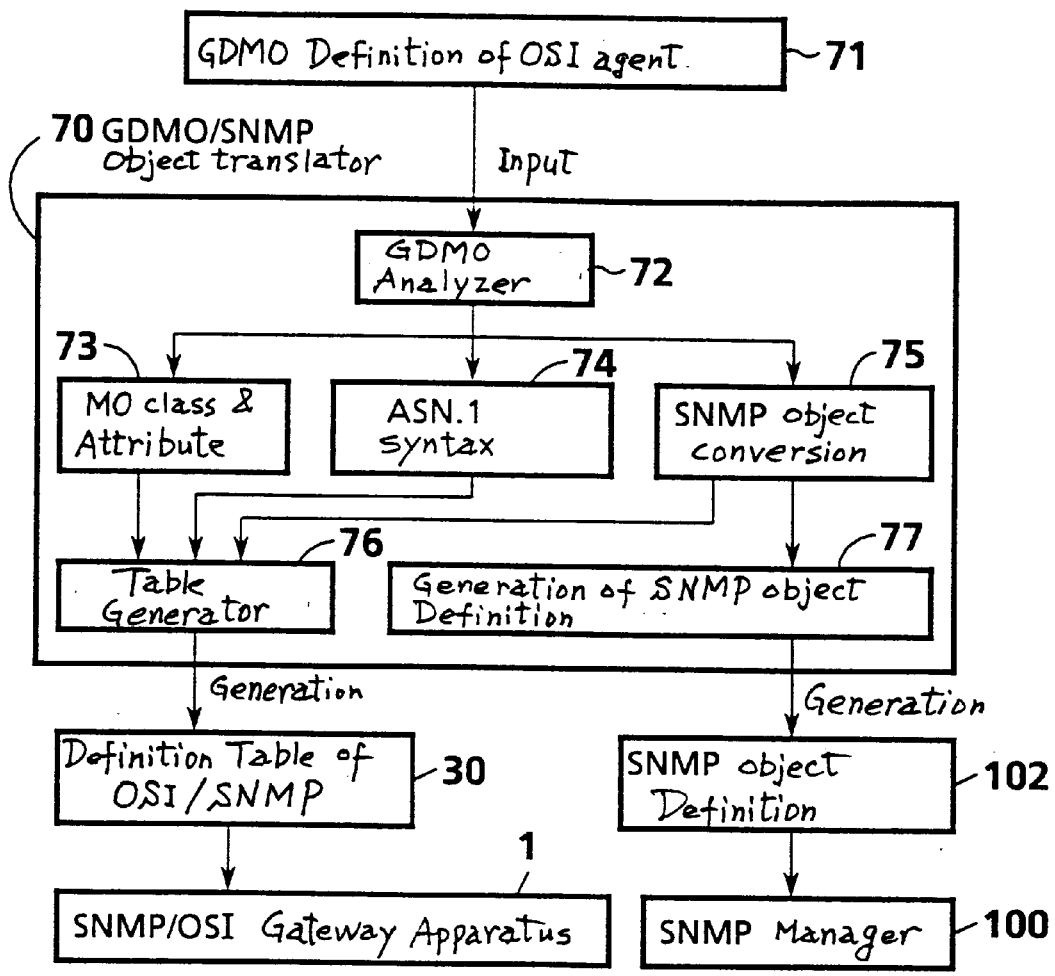
FIG. 2 shows a configuration of an object translator.
Figure 6:
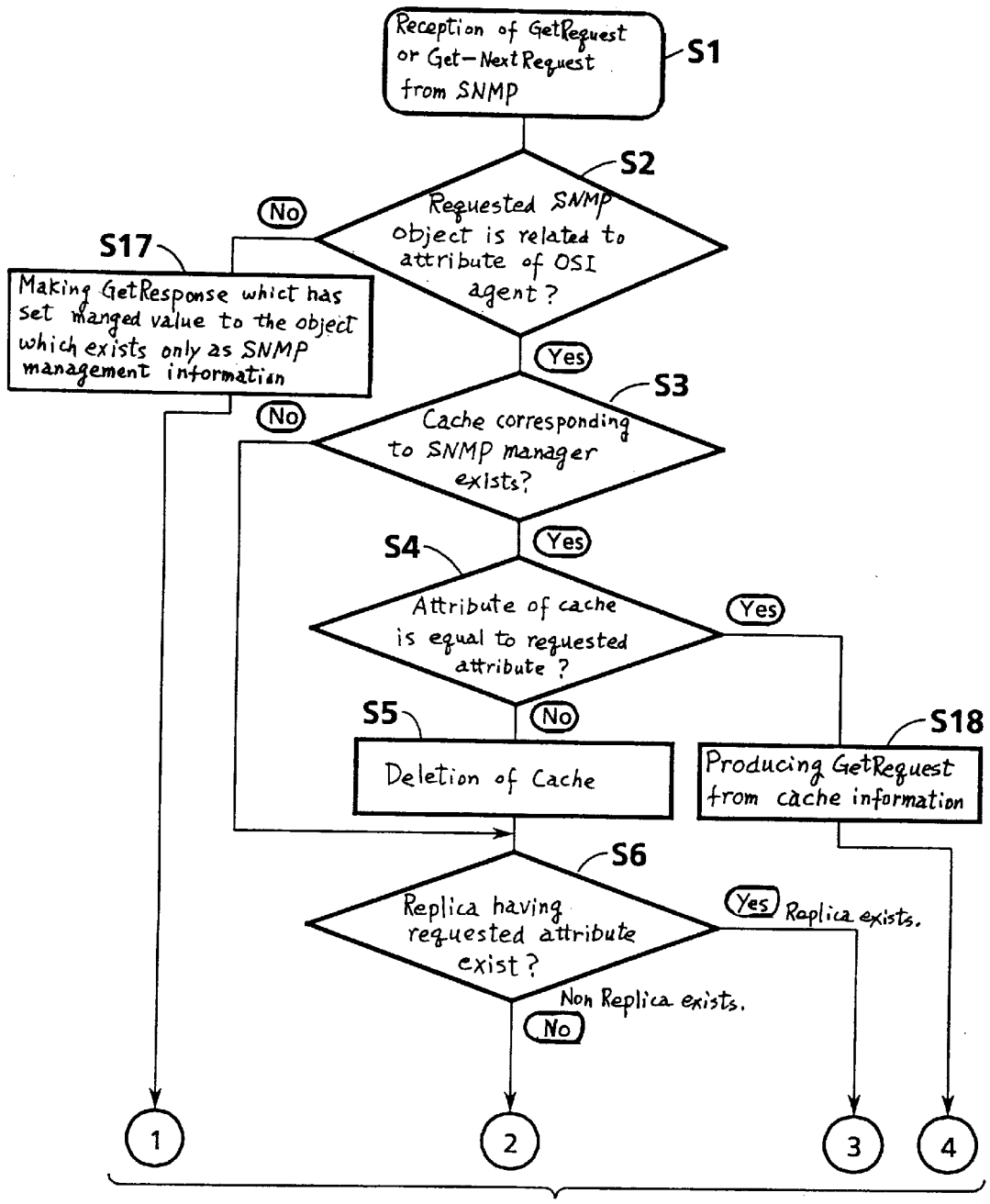
FIG. 6 shows one part of processing in a case of receiving GetRequest or Get-NextRequest from SNMP manager.
Figure 7:
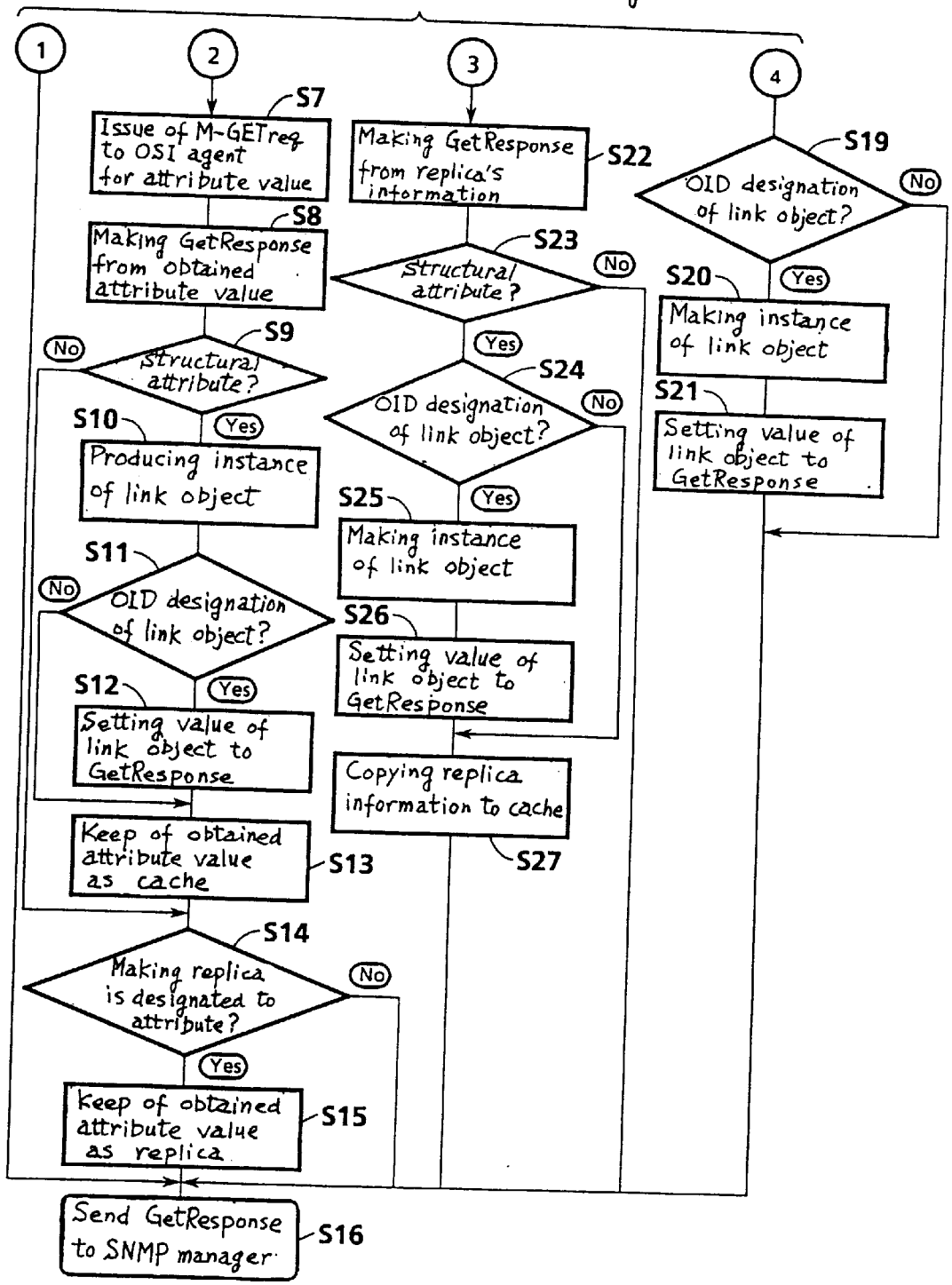
FIG. 7 shows remaining process continued from FIG. 6.
Figure 8:
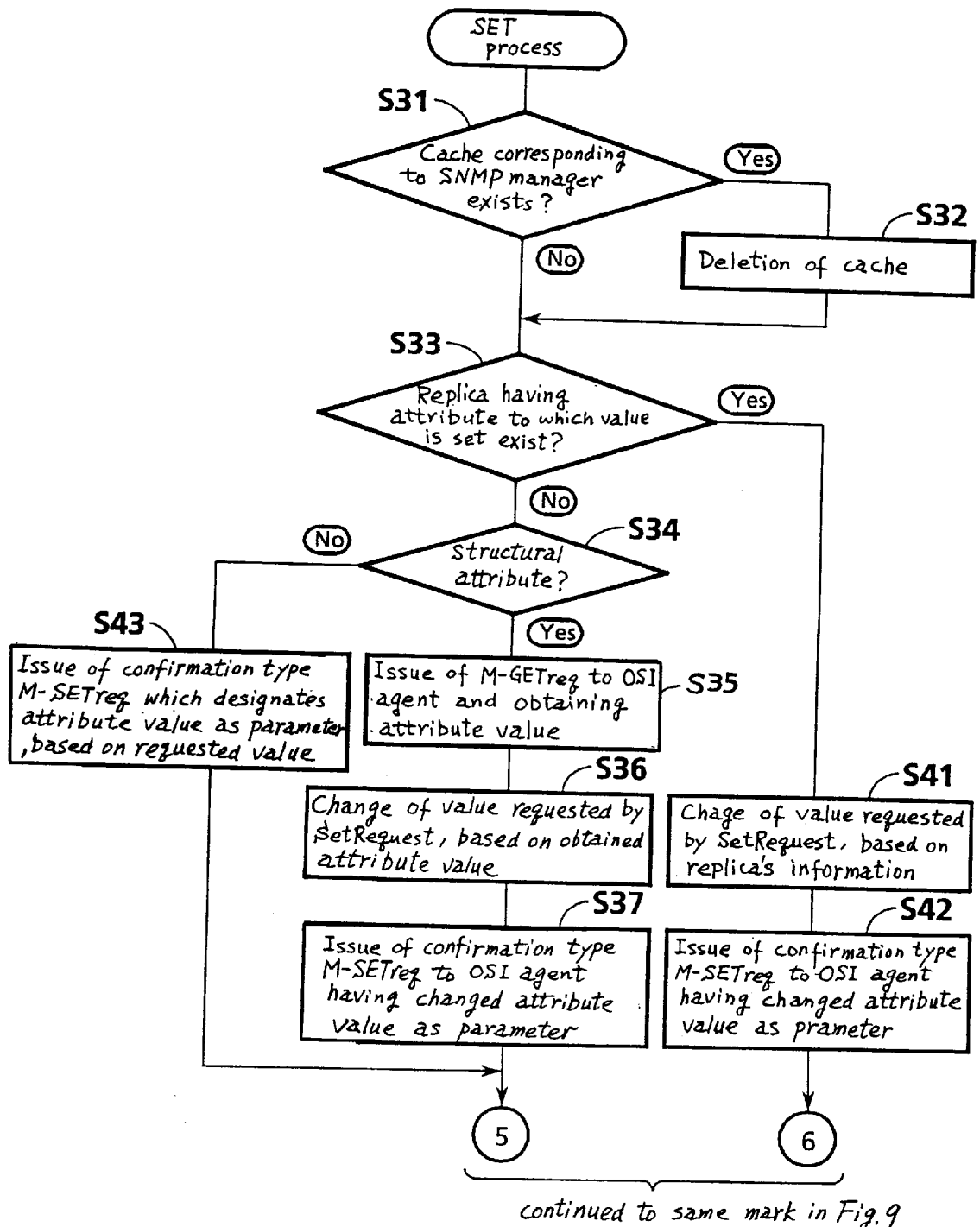
FIG. 8 shows one part of SET process.
Figure 9:
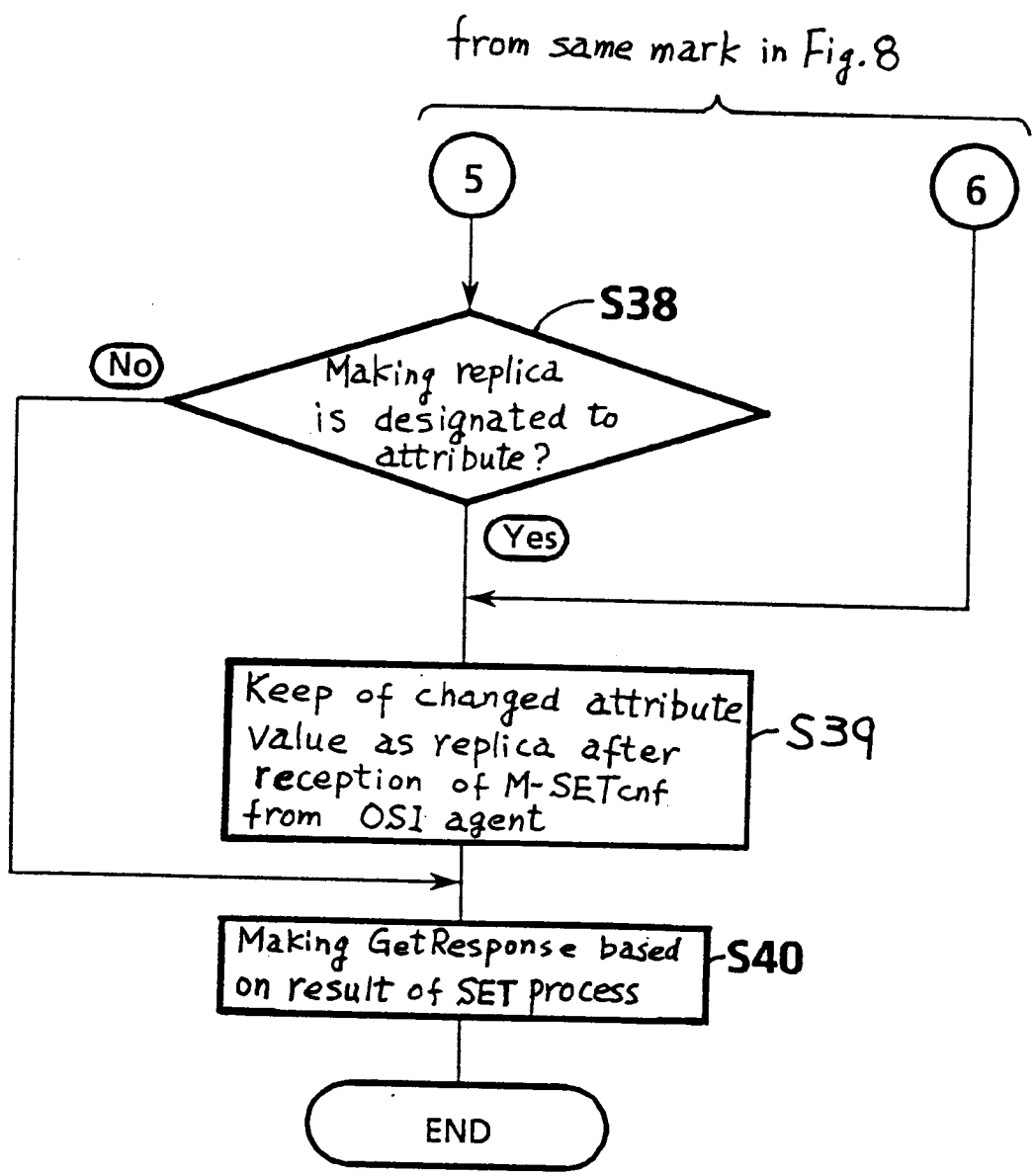
FIG. 9 shows remaining process continued from FIG. 8.
Figure 10:
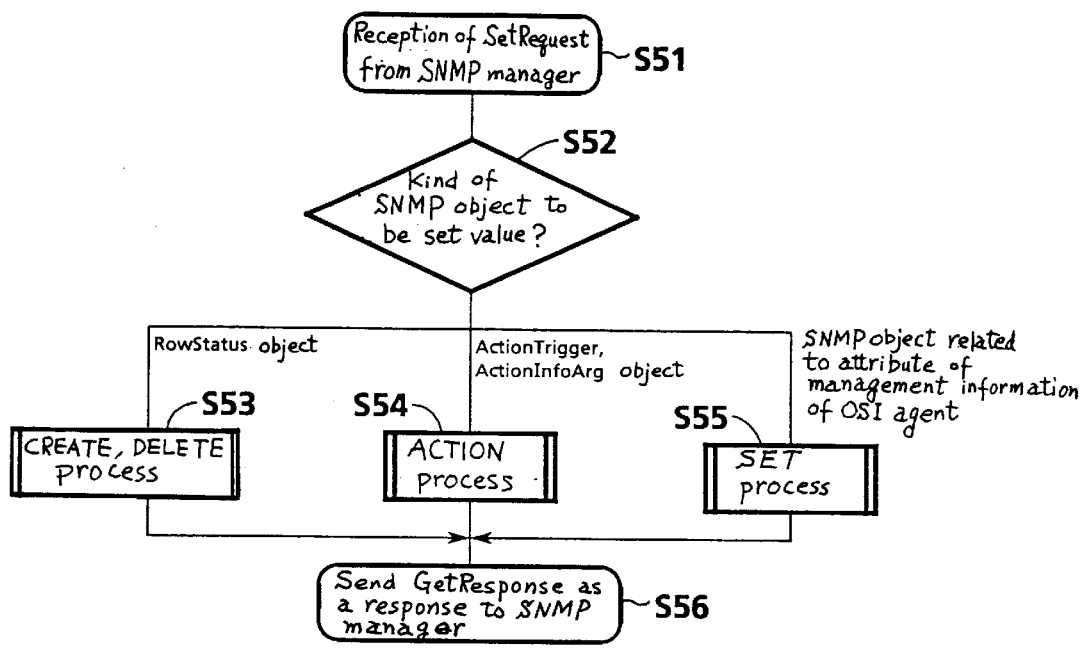
FIG. 10 shows processing in a case of receiving SetRequest from SNMP manager.
Figure 11:
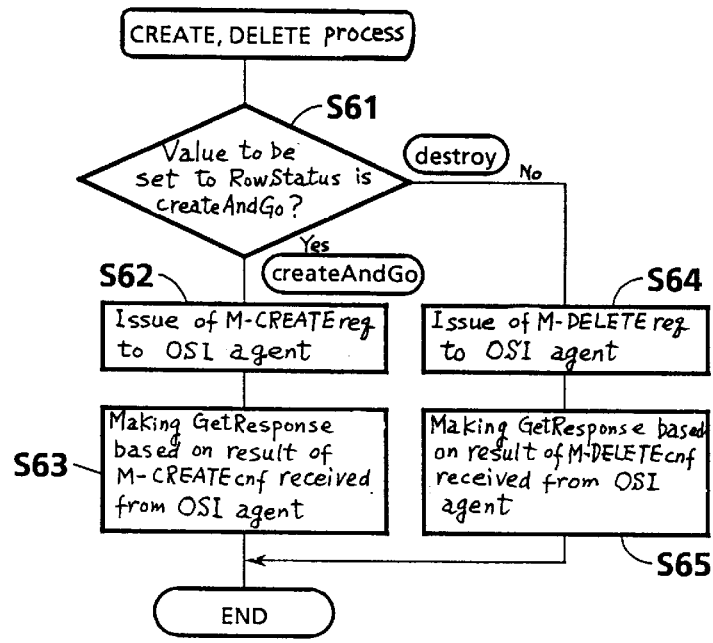
FIG. 11 shows CREATE and DELETE process.
Figure 12:
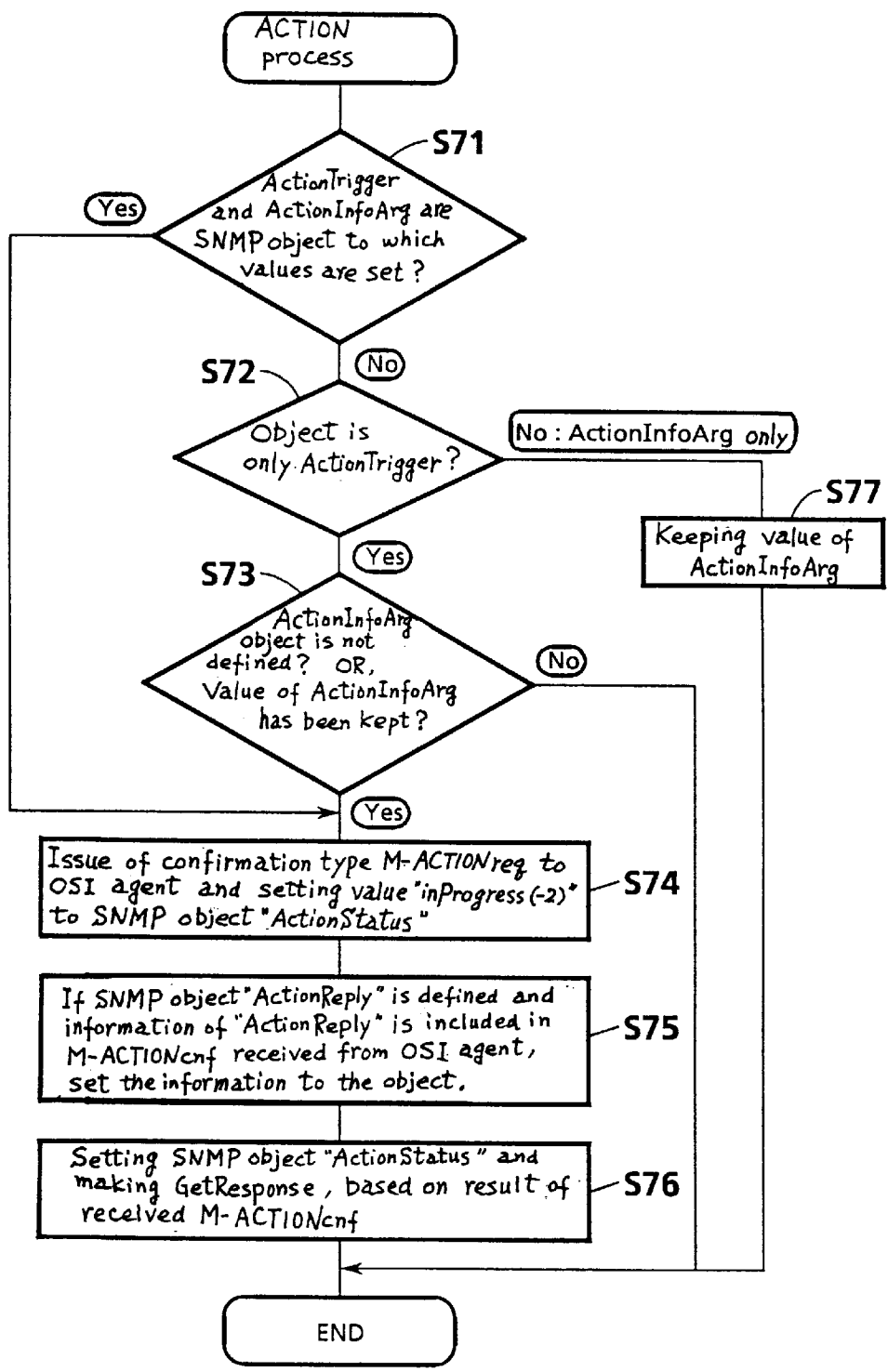
FIG. 12 shows ACTION process.
Figure 13:
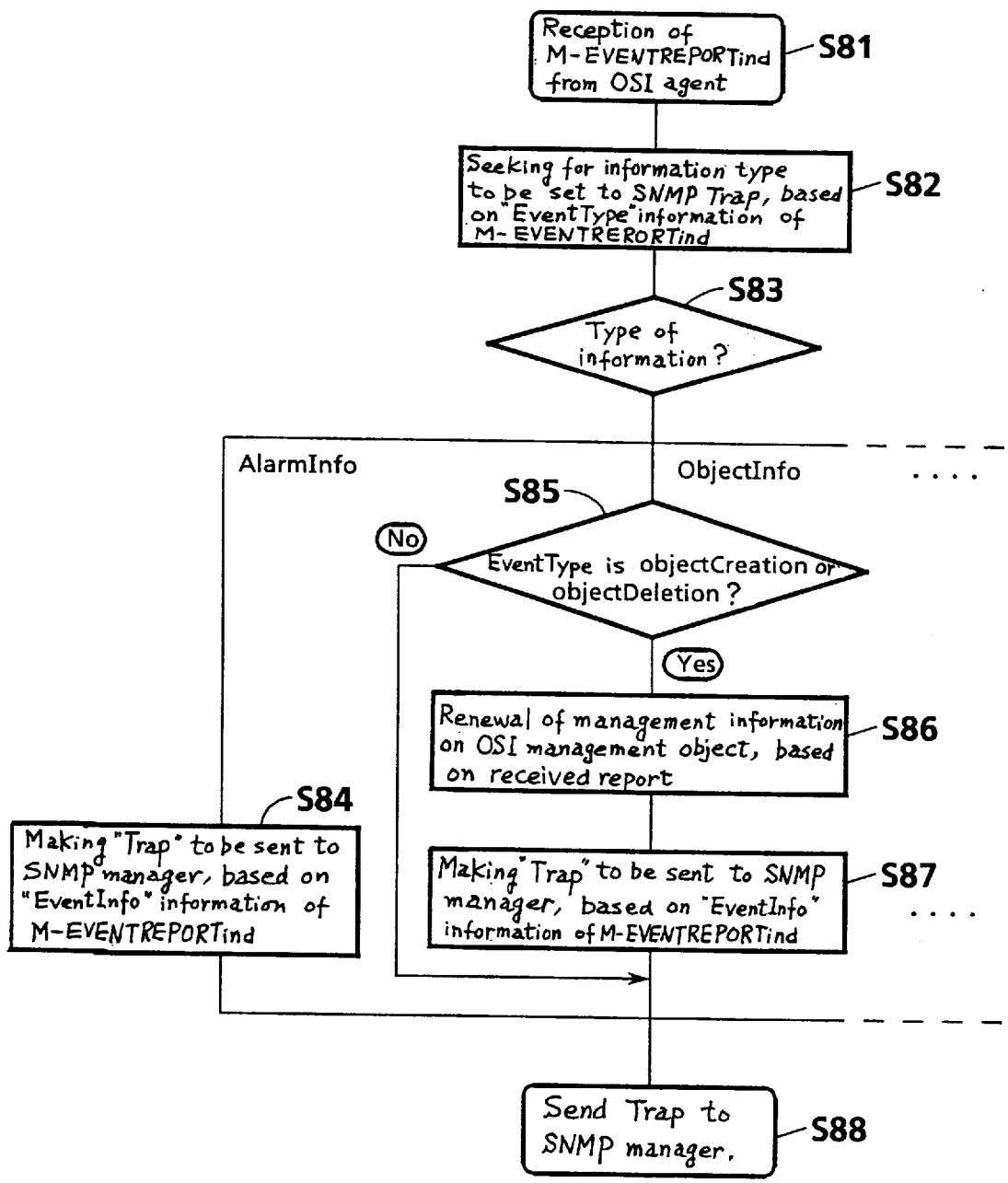
FIG. 13 shows processing in a case of receiving M-EVENTREPORTind from OSI management agent.
Figure 14:
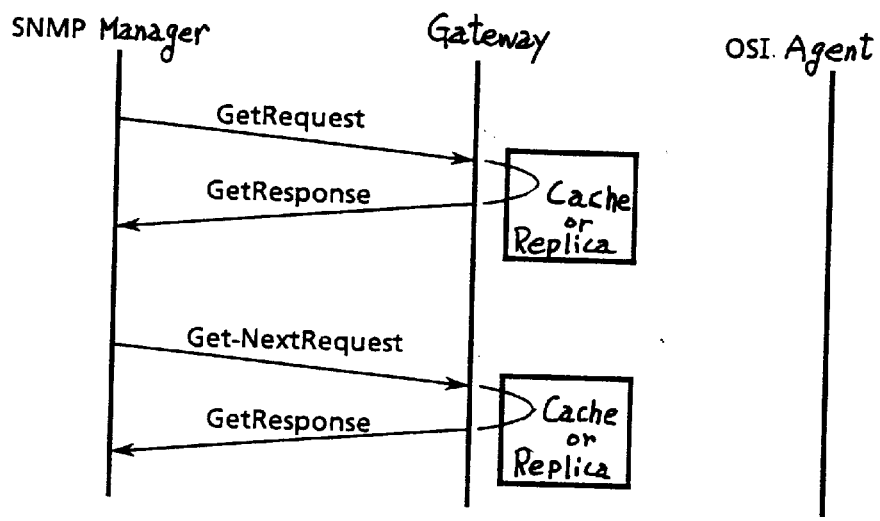
FIG. 14 shows processing in a case of existence of cache or replica.
Figure 15:
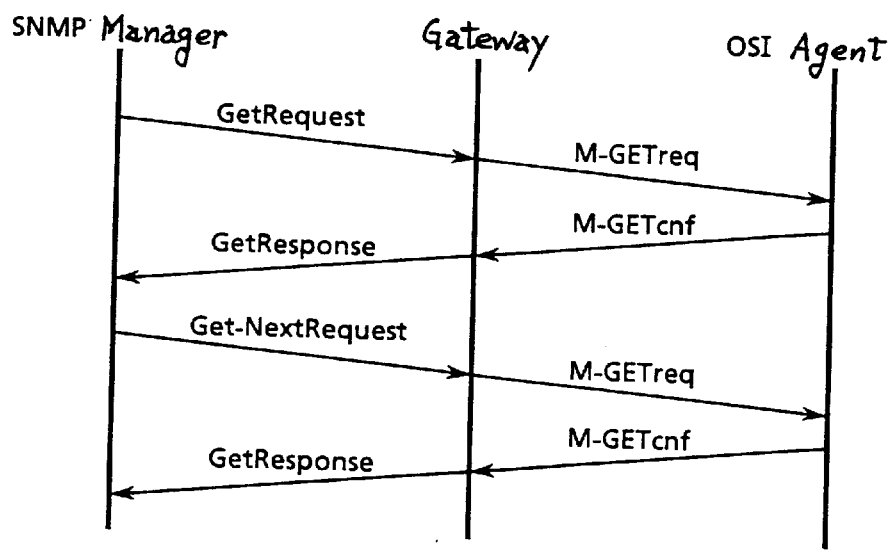
FIG. 15 shows processing in a case of not existence of cache or replica.
Figure 16:
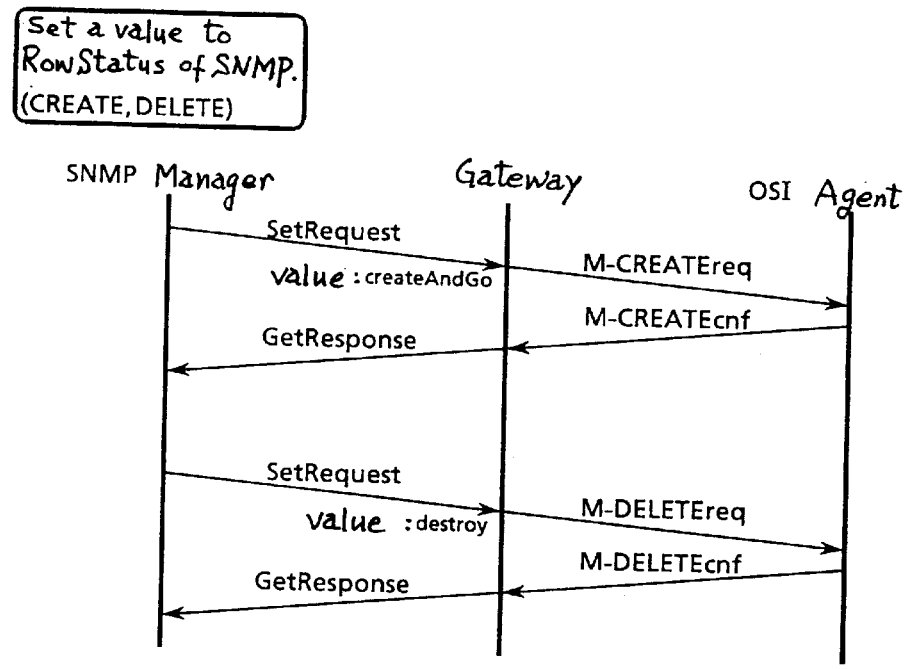
FIG. 16 shows processing in a case of setting a value in an object RowStatus of SNMP.
Figure 17:
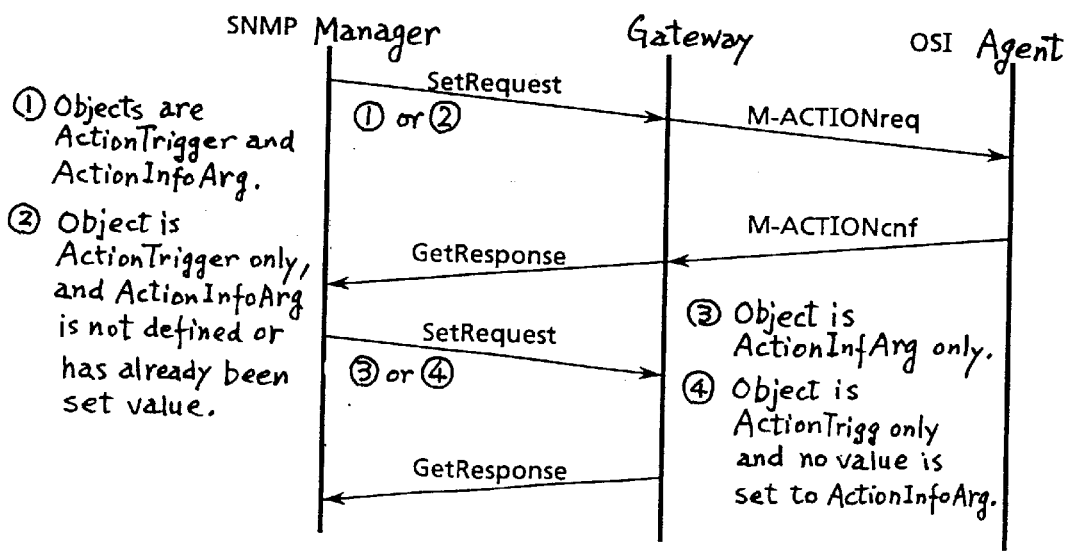
FIG. 17 shows processing in a case of setting a value in an object ActionTrigger, ActionInfoArg of SNMP.
Figure 18:
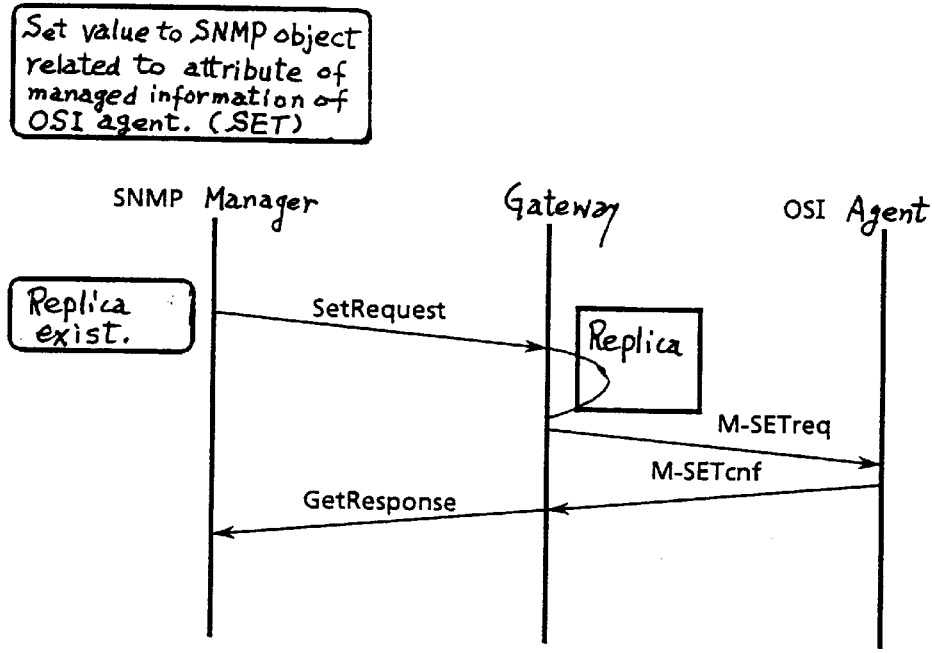
FIG. 18 shows SET process in a case of existence of a replica.
Figure 19:
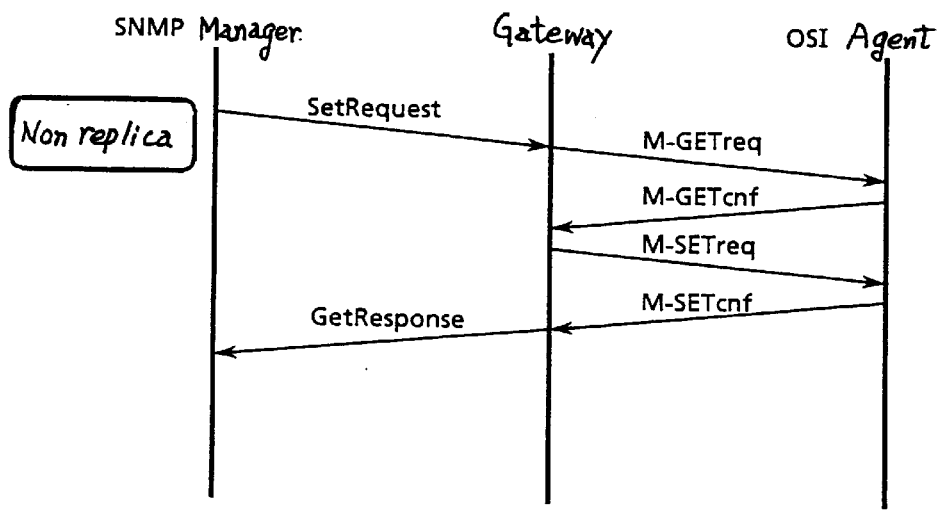
FIG. 19 shows SET process in a case of not existence of a replica.
Figure 20:
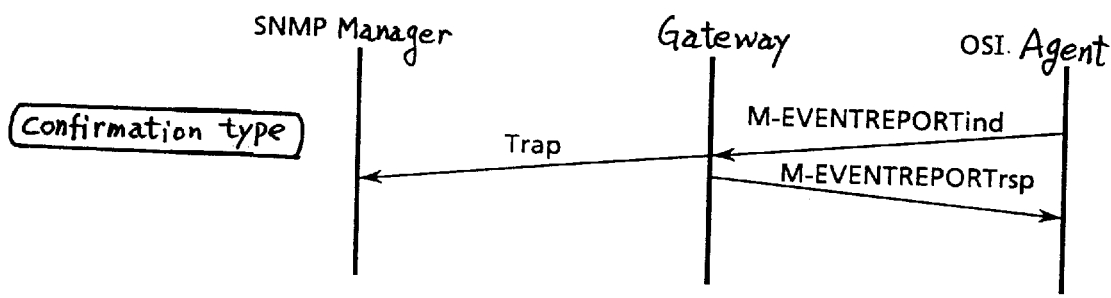
FIG. 20 shows processing in a case of receiving confirmation type M-EVENTREPORTind from OSI management agent.
Figure 21:
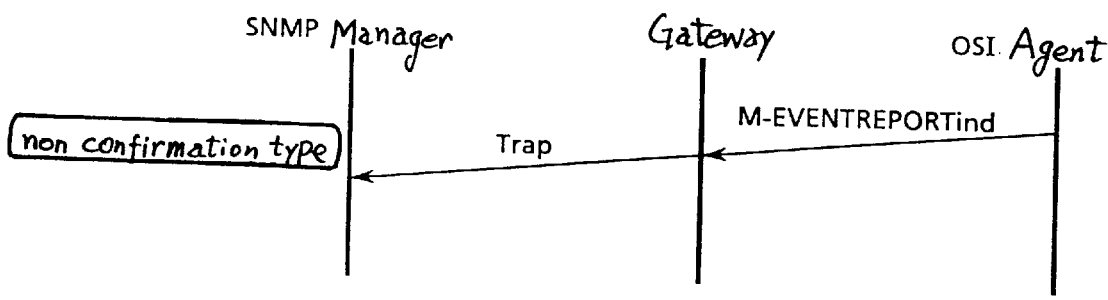
FIG. 21 shows processing in a case of receiving non confirmation type M-EVENTREPORTind.

As shown in FIG. 2, the object translator 70 comprises GDMO analysis means 72 for analyzing the GDMO definition 71, means 73 for extracting MO class and attribute from the result of the analyses, means 74 for extracting an ASN.1 syntax, SNMP object conversion means 75 for converting to the SNMP management information, means 76 for generating the definition table from the result of these three means 73, 74 and 75, and means 77 for generating the definition 102 of the SNMP management information from the result of the SNMP object conversion means 75.

FIG. 3 shows a part of the definition table 30 automatically generated by the translator 70. In FIG. 3, the SNMP management information definition is converted from MO class "alarmRecord" in the ITU-T recommendation X.721, wherein an SNMP entry (smi2AlarmRecordEntry), an SNMP management object items (smi2AlarmRecIndex, smi2AlarmRecLogRecordId, smi2AlarmRecLoggingTime, etc.), and OSI management attributes (logRecordId, loggingTime, etc.) related to each management object item are generated.

Because in the present invention the gateway apparatus 1 is independent from the TMN device, it is possible that the instance information means 60 independently keeps the object instance information (so-called as an containment tree or a name tree) which is managed by the OSI management agent 500. Concretely, the containment tree is previously set in the instance information means 60, the instance managing means 50 adds or deletes an object instance to/from the containment tree when the instance managing means 50 obtains a notification of "ObjectCreation" or "ObjectDeletion" via the conversion means 40 by receiving the "M-EVENTREPORTind".

The conversion means 40 converts below-mentioned management operations (1)~(7) among SNMP and CMIP based on the relation shown in FIGS. 4 and 5. Further, the conversion means 40 converts the management object item of SNMP to an MO class, an object identifier, an attribute-type and an attribute value referring to the definition table 30 and the instance information means 60. Therefore, as shows FIGS. 6~21, process is treated.

(1) getting a value of a managed object.

(2) getting a value of an item next to the managed object which is a value corresponding to an item next to the SNMP object).

(3) setting a value of a managed object.

(4) reporting an event occurred in the OSI management agent 500.

(5) creating a managed object.

(6) deleting a managed object.

(7) indicating an action to a managed object.

For getting a value of a managed object, "GetRequest" of SNMP is converted to "M-GETreq" of CMIP, and "M-GETcnf of CMIP" is converted to "GetResponse" of SNMP, then they are transferred. However, as after-mentioned in detail, when a cache or a replica exists, "M-GETreq" is not transferred.

For getting a value of an item next to a managed object, "Get-NextRequest" of SNMP is converted to "M-GETreq" of CMIP", "M-GETcnf" of CMIP is converted to "GetResponse" of SNMP, then they are transferred. However, as after-mentioned in detail, when a cache or a replica exists, "M-GETreq" is not transferred.

For setting a value of a managed object, the value is set only when an SNMF management object item to be operated is corresponding to an attribute in OSI management agent. In such a case, "SetRequest" of SNMP is converted to a confirmation type "M-SETreq" of CMIP, "M-SETcnf" of CMIP" is converted to "GetResponse" of SNMF, then they are transferred. However, as after-mentioned in detail, when no replica exists and there is a correspondence of structural type attribute, "M-GETreq and M-GETcnf are transferred between agent before "M-SETreq" is transferred.

For reporting an event occurred in an agent, confirmation type "M-EVENTREPORTind" and non confirmation type "M-EVENTREPORTind" of CMIP are converted to "Trap" of SNMP and then transferred. If "M-EVENTREPORTind" is a confirmation type, "M-EVENTREPORTrsp" is transferred to the agent.

For creating a managed object, the managed object is created only when a management object item, to be operated, of SNMP is "RowStatus" and its value to be set is "createAndGo", wherein "SetRequest" of SNMP is converted to "M-CREATEreq of CMIP and "M-CREATEcnf" of CMIP is converted to "GetResponse" of SNMP, then they are transferred. Herein, a meaning of "RowStatus" is an object in an SNMP entry, if its value is "createAndGo" it means to enable all of the entry, and if its value is "destroy" it means to disable all of the entry.

For deleting a managed object, the managed object is deleted only when a management object item, to be operated, of SNMP is "RowStatus" and its value to be set is "destroy", wherein "SetRequest" of SNMP is converted to "M-DELETEreq of CMPF and "M-DELETcnf" of CMIF is converted to "GetResponse" of SNMP, then they are transferred.

For indicating an action to a managed object, the action to the managed object is indicated only when a management object item, to be operated, of SNMP is "ActionTrigger" and/or "ActionInfoArg", wherein "SetRequest" of SNMP is converted to a confirmation type "M-ACTIONreq" of CMIP and "M-ACTIONcnf" of CMIP is converted to "GetResponse" of SNMP, then they are transferred. Concretely, the confirmation type of "M-ACTIONreq" is transferred when a management object item, to be operated, of SNMP is "ActionTrigger" and "ActionInfoArg", or when the management object item, to be operated, of SNMP is only "ActionTrigger" and "ActionInfoArg" is not defined, or when the management object item, to be operated, of SNMP is only "ActionTrigger" and "ActionInfoArg" has been set.

As above-mentioned, a command of CMIP is transferred on a telecommunication line, by independently defining a conversion method between SNMP and CMIP. In this point, the present invention is different from IIMC system of NMF in which no command of CMIP is transferred on the telecommunication line because a management operation is converted by IIMC system inside of TMN device.

The present invention is based on the correspondence of the definition of the management information by IIMC system of NMF, but in the present invention, a management information model is added to reducing a number of times of issuing a management operation of SNMP and CMIP and to enable an easily automatic conversion of the management information. For example, if a structural type nest such as SEQUENCE-type is deeper than a predetermined step in a correspondence of an attribute, no pointer is used then the structural type is originally corresponded to OPAQUE-type of a single SNMP object in the present invention. Further, an object indicating a number of an instance in a management object of OSI management, an object indicating whether or not a conditional attribute exists in an instance of a management object, an object indicating whether or not an optional component exists in SEQUENCE-type or SET-type, an object indicating whether or not an information of a selected component exists in CHOICE-type, and, an object indicating a repetition number of a component in SEQUENCE OF-type or SET OF-type are originally added to the present invention. Furthermore, for reducing a number of times of issuing a management operation, cache means 41, replica means 42 and link object means 43 are provided to the conversion means 40, then, the following functions (a)~(c) of cache, replica and link object are achieved.

(a) Function of cache 41: Basically, a management operation is issued to OSI management agent at every time when the conversion means 40 receives a request from SNMP manager for getting a value. But in the function of the cache, an attribute value of a structural type, which was obtained from OSI management agent by a previous operation, is kept as a cache in the cache means 41. When the conversion means 40 continuously receives a request for getting a value corresponding to the same attribute from SNMP manager, the conversion means 40 transfers the value by using the cache as a response to SNMP manager. Therefore, in a case that SNMP manager gets access two times or more to the same attribute of structural type, it is possible to reduce an issue of a second and more management operations to OSI management agent.

(b) Function of replica 42: An issue of a management operation to OSI management agent is suppressed by copying a value of a certain attribute in all management information of OSI management agent and by keeping the copy as a replica. Further, by keeping the replica, it is possible to change only a part of the attribute value. A certain structural type attribute of OSI management information is converted to two or more management items of SNMP management information. Therefore, if there is no replica, SNMP manager must issue a request for setting values of all management items to be changed and a value to be set. However, if there is a replica, it is possible to automatically obtain, from the repilc a, a value which is not changed. Therefore, it is necessary to designate only a value of the management item to be changed for a request of setting a value. It is possible to designate whether or not a replica must be kept according to every attribute, because there is an attribute of which replica is not useful to keep. For example, such attribute is one of which content frequently changes.

(c) Function of link object 43: An information of the link object is an information which indicates a structure of SNMP management item converted from and corresponded to a certain structural type attribute of OSI management information. The link object information is supplied to SNMP manager and the information is used by SNMP manager. By using the link object information, SNMP manager can get access to all levels of a structure by two times or less management operations.

An addition of management information model will be explained.

(1) Use of OPAQUE-type: When a management information definition of OSI is converted to a management information definition of SNMP, in the following case (a) or (b), the conversion is carried out by using OPAQUE-type.

(a) When a type of an attribute of OSI management information definition is a structural type (SEQUENCE, SET, CHOICE, SEQUENCE OF, SET OF) and a relation of a type in components of the attribute is recursive, the attribute is converted to a single SNMP object of OPAQUE-type. For example, as shown in FIG. 22, the component "and" and "or" of the attribute "CMIS Filter" included in OSI management object definition are the recursive cases connected to "CMIS Filter".

(b) When a type of an attribute of OSI management information definition is a structural type (SEQUENCE, SET, CHOICE, SEQUENCE OF, SET OF), the attribute is converted as a side table. If a type of component included in the side table is a structural type, further one side table in next step is made. When a step of a side table is more than a predetermined number by spreading and converting an attribute in above-mentioned manner, the attribute is converted to a single SNMP object of OPAQUE-type. For example, FIG. 23 shows a pattern of an attribute type to be converted to OPAQUE-type in the case that two or more steps are limited.

(2) A number of instance of management object: For representing a number of instance of OSI management object, an INTEGER-type object indicating the number is added to the SNMP management information item to be converted.

(3) An existence of a conditional attribute: For representing whether a conditional attribute of OSI management information definition exists or not, an OCTET STRING-type object indicating the existence is added to SNMP management information item to be converted.

(4) An existence of an optional component of SEQUENCE-type or SET-type: In the case that an attribute type of OSI management information definition is a SEQUENCE-type or a SET-type, an OCTET STRING-type object is added to SNMP management information item to be converted, wherein the OCTET STRING-type object indicates whether or not an optional component exists in the attribute.

(5) Information of selection of a component in CHOICE-type: In the case that an attribute type of OSI management information definition is a CHOICE-type, an INTEGER-type object indicating the selected component of the attribute is added to SNMP management information item to be converted.

(6) Repetition number of a component in SEQUENCE OF-type or SET OF-type: In the case that an attribute type of the management information definition is a SEQUENCE OF-type or a SET OF-type, an INTEGER-type object indicating a repetition number of the component of the attribute is added to SNMP management information item to be converted.

A technique for reducing a number of issue of a management operation will be explained.

(1) Cache means 41: When an attribute value obtained by an issue of M-GETreq is a structural type (SEQUENCE, SET, CHOICE, SEQUENCE OF, SET OF), GetResponse is transferred to SNMP manager and the value is kept as a cache in cache means 41, wherein M-GETreq is the management operation for obtaining a management information of OSI agent and is related to the management operation GetRequest or Get-NextRequest from SNMP manager. If a next request from SNMP manager is GetRequest or Get-NextRequest to the attribute value kept as a cache, the information (attribute value) kept in the cache is transferred to SNMP manager by using GetResponse without an access to OSI agent. Features of the cache in the present embodiment are as follows.

(i) One independent cache is allocated to every SNMP manager.

(ii) When an attribute value is a structural type (SEQUENCE, SET CHOICE, SEQUENCE OF, SET OF), the value is kept as a cache. An attribute value of another type is not kept as a cache. This process is executed in every SNMP manager.

(iii) The value being kept as a cache is deleted when an access to a new attribute except for the cache occurs. The new attribute value obtained by the access from OSI agent is kept as a cache if a type of the value is a structural type. If not, the value is not kept as a cache. This process is executed in every SNMP manager.

(iv) The value being kept as a cache is deleted when the SetRequest from SNMP manager occurs. This process is executed in every SNMP manager.

(v) Each cache of all SNMP managers is deleted when an association (a logical connection) to OSI agent is disconnected.

(2) Replica means 42: When an attribute value obtained by an issue of M-GETreq has not existed as a replica in the replica means 42, the obtained value is transferred to SNMP manager, wherein M-GETreq is the management operation for obtaining a management information of OSI agent and is related to the management operation GetRequest or Get-NextRequest from SNMP manager. In this case, if there is a designation for producing a replica of the obtained value, the replica of the value is produced in the replica means 42. If not, no replica of the value is produced. If a next request from SNMP manager is GetRequest or Get-NextRequest to the attribute value of the replica, the information (attribute value) of the replica is transferred to SNMP manager by using GetResponse without an access to OSI agent. When SetRequest from SNMP manager occurs, if there is a replica of an attribute value of OSI agent to be set by SetResponse, a value of a part requested by SetRequest is changed based on the replica's information, and M-SETreq is issued to OSI agent. The replica's information is exchanged by M-SETcnf of OSI agent to a new replica's information of which value has been changed, the old replica's information before changing is deleted. Further, if there is not a replica, an attribute value is obtained by issuing M-GETreq to OSI agent, then a value of a part requested by SetRequest is changed based on the value obtained by M-GETreq, and M-SETreq is issued to OSI agent. After issuing M-SETreq, when M-SETcnf from OSI agent is received, if there is a designation for producing a replica, a replica of the attribute value which has been changed is produced. If not, no replica of the value is produced. Features of the replica in the present embodiment are as follows.

(i) It is possible to manage plural replicas of which attributes are different with each other.

(ii) In producing a replica, the oldest replica is deleted when a number of replica is more than the predetermined maximum.

(iii) The oldest replica is periodically or repeatedly deleted by a timer means.

(iv) It is possible to designate whether a replica must be produced or not in every attribute of OSI agent. A replica can be produced for all types of attribute.

(v) All replica are deleted when an association (a logical connection) to OSI agent is disconnected.

(3) Link object means 43: Link object is a data structure which indicates a design of a table, all indexes which can be used in each table, and a hierarchical structure of the table, as a structure of the table, wherein the table is SNMP management information converted and spread from an attribute of a structural type (SEQUENCE, SET, CHOICE, SEQUENCE OF, SET OF) of OSI management information. Such link object is generated when an access occurs to the structural attribute of management information of OSI agent, based on a request from SNMP manager. SNMP manager, which intends to obtain a link object, designates a pair of OID (ObjectIdentifier) to the request GetRequest, wherein one OID is a name of a structural type attribute and other is an OID of a link object which is allocated to a management object class including the attribute. ASN.1 definition of the link object is shown in FIG. 24. The word "index" in the ASN.1 definition denotes an index value used in the table, the word "child" denotes a design of the side table, wherein "OPTIONAL" in the final step of spreading the side table is applied to "child". Features of the link object in the present embodiment are as follows.

(i) One independent link object is allocated to every management object class of OSI management information.

(ii) As the result of (i), it is not possible to obtain the link object information corresponding to plural attributes in same object class by one request.

Figure 25:
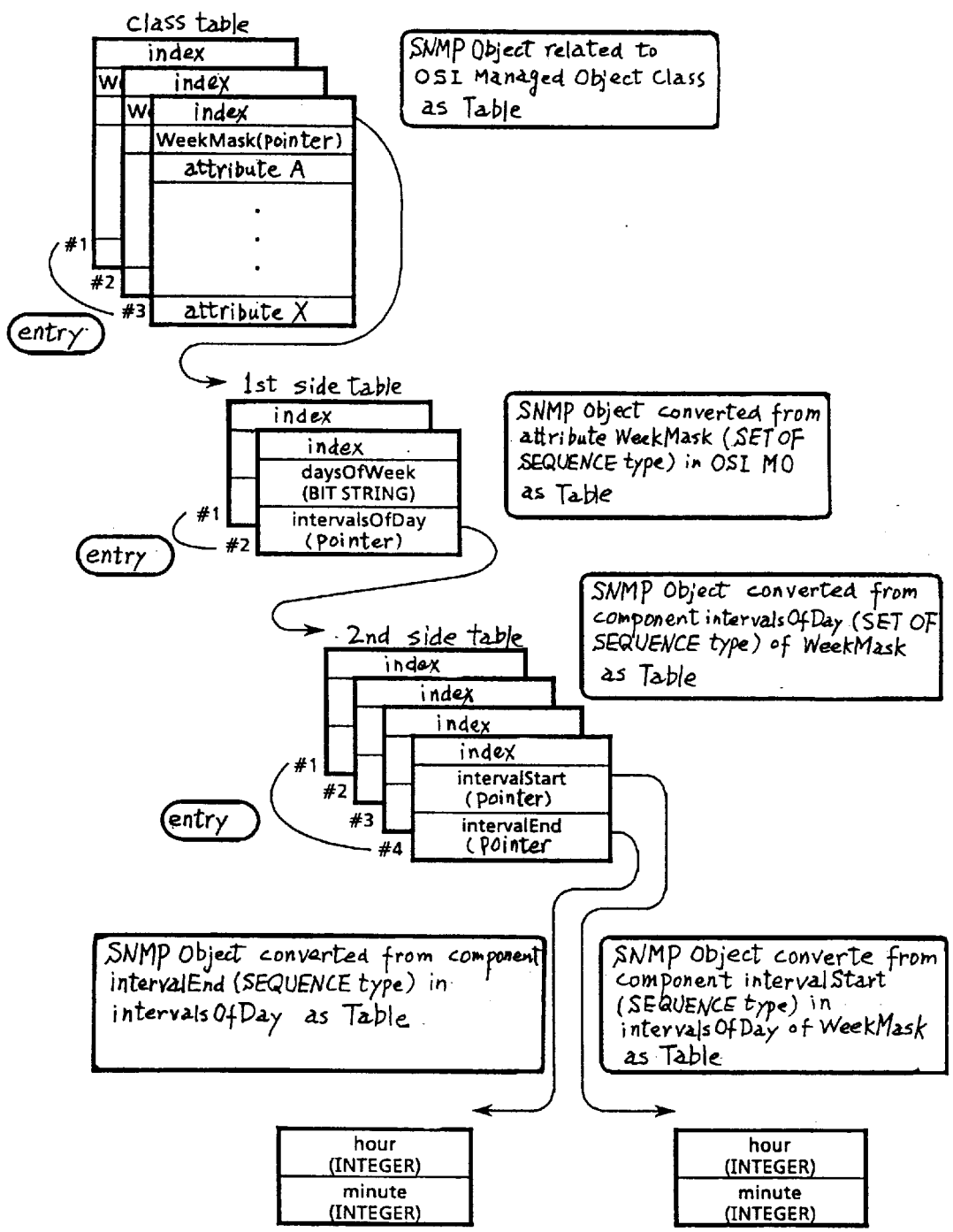
FIG. 25 shows conversion to SNMP object from OSI management object including an attribute WeekMask defined in FIG. 27.
Figure 26:
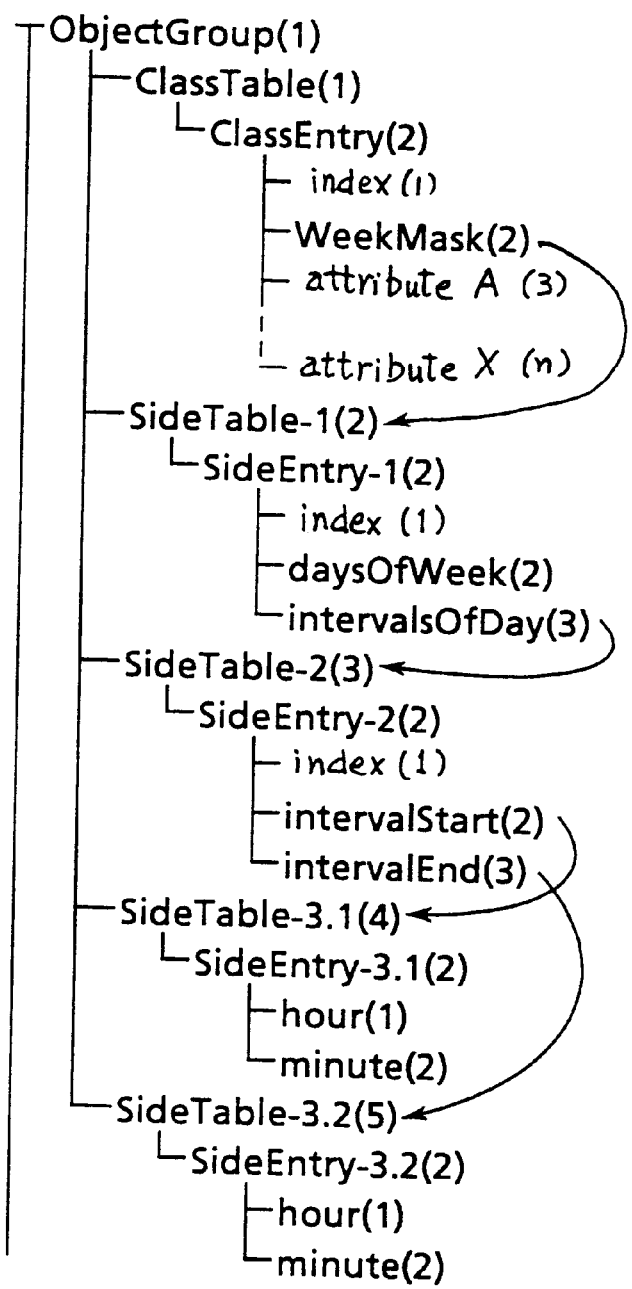
FIG. 26 shows an SNMP object tree corresponding to FIG. 25.
Figure 30:
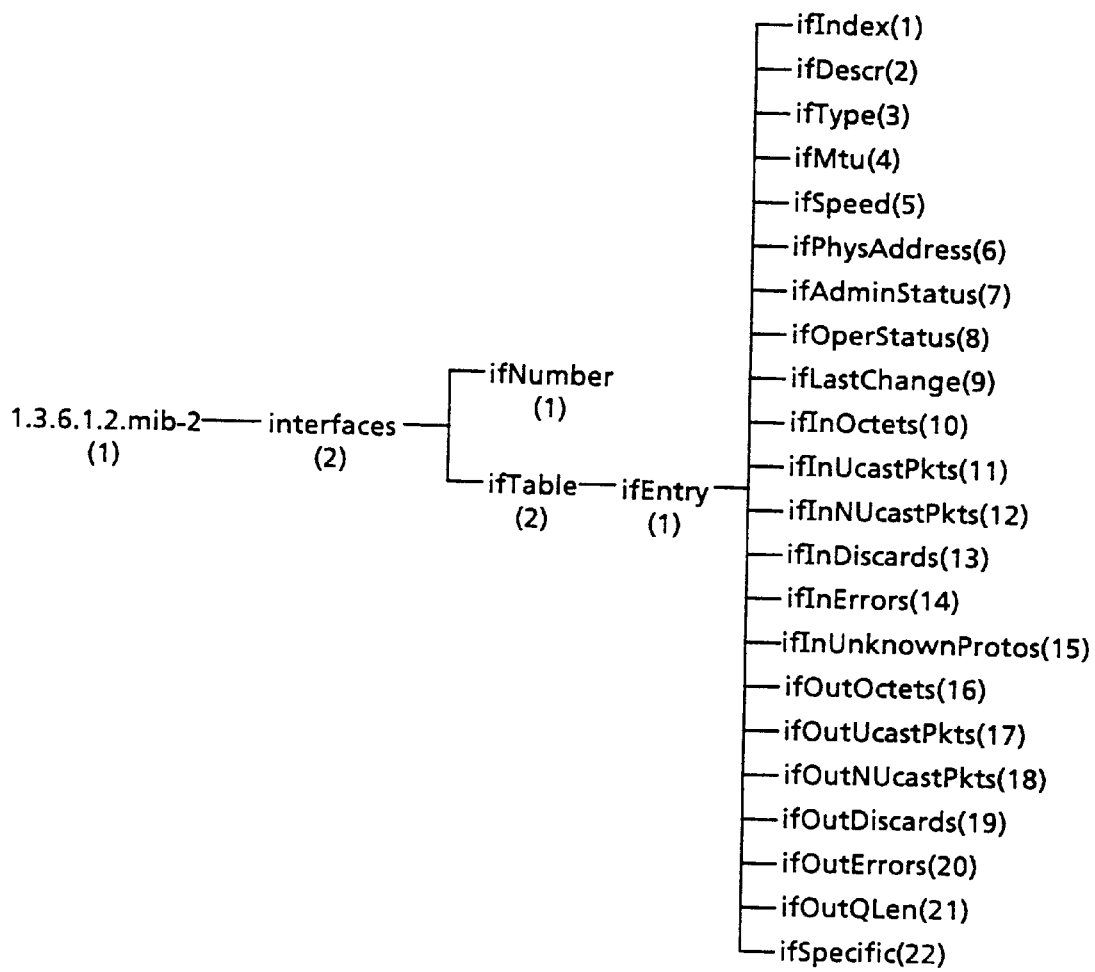
FIG. 30 shows an interface group in SNMP.

For example, FIGS. 25–27 show conversion from OSI management object to SNMP object.

An effect of using OPAQUE-type will be explained. When an attribute included in OSI management object and a component included in the attribute are structural type (SEQUENCE of, SET OF, SEQUENCE, SET, CHOICE), the attribute and its component are related to SNMP side table (WeekMask, intervalStart etc. shown in FIG. 25). A component included in the structural type is related to an object of an entry of the side table (dayOfWeek, hour etc. shown in FIG. 25). Therefore, when a number of the component increases, a number of object of SNMP side table increases.

Then, a number of access times increases by issuing GetRequest or Get-NextRequest to all objects of entry in side table, in the case that SNMP manager obtains a value of a structural attribute of OSI management object. When a component of the structural attribute is a type having a repetition of a structural nest, the component is related to an multi-step side table. Therefore, for an access to an end table by SNMP manager, it is necessary to trace all pointers by issuing GetRequest or Get-NextRequest, then the access is difficult and the access of times is increased. For example in FIG. 25, in case of obtaining a value of the object in third side table (hour or minute), four times of access are necessary by first access to obtain the value of pointer object (WeekMask) of the top class table, second access to obtain the value of pointer object (intervalsDay) of first side table indicated by the value of WeekMask and third access to obtain the value of pointer object (intervalStart or intervalEnd) of second side table indicated by the value of intervalsDay.

In the present embodiment, it is possible to limit the step of side table to be related, then it is possible for SNMP manager to obtain the attribute value by issuing only one GetRequest or only one Get-NextRequest, because OPAQUE-type is related to the attribute of OSI management object which is related to multi-step side table.

An effect of existence of conditional attribute will be explained. An attribute included in OSI management object is related to an object in an entry of SNMP class table (WeekMask, etc. shown in FIG. 25). Therefor, when SNMP manager requests an access to the conditional attribute, it is impossible to judge whether the attribute is conditional or not. Then even if no instance exists, one access to OSI agent occurs in every access of SNMP manager.

In the present embodiment, an object indicating whether or not the conditional attribute exists in the attributes related to the object in the entry of the class table. Therefore, it is possible to know whether or not an instance exists by issuing one GetRequest.

An effect of a number of the instance of the management object will be explained. The number of the instance of the OSI management object is related to an arrangement of the entry included in SNMP class table. Therefore, it is necessary for SNMP manager to know the number by repeatedly issuing a last object (attribute X in FIG. 25) and GetRequest designating an index value, wherein a number of times of issue is equal to the number of the arrangement of the entry (three times in FIG. 25).

In the present embodiment, it is possible to know the number of the instance by issuing only one GetRequest to obtain the value of the object because of adding the object indicating the number of the instance.

An effect of existence of an optional component of SEUQENCE-typ and SET-type will be explained. When an attribute included in OSI management object and a component included in the attribute are SEQUENCE-type or SET-type, the attribute and its component are related to a side table of SNMP. Further, a component included to SEQUENCE-type or SET-type is related to an object in an entry of the side table. In the relation, a component designated as optional is necessarily related to the object. Therefore, when SNMP manager requests an access to the optional object, it is impossible to judge whether the object is optional or not. Then, even if there is no instance, an access to OSI agent occurs at every access of SNMP manager.

In the present embodiment, it is possible to know whether the instance exists or not by once issuing GetRequest obtaining a value of the object, because of adding an object indicating whether or not the optional component exists in the component related to the object in the entry of the side table. Further, it is possible for SNMF manager to suppress an invalid access to the object having no instance.

An effect of selection information of a component in CHOICE-type will be explained. When an attribute included in OSI management object and a component included in the attribute are CHOICE-type, the attribute and its component are related to SNMP side table. Further, a component included in CHOICE-type is related to an object in an entry of the side table. When SNMP manager requests an access to the object, it is impossible to judge what kind of component included in CHOICE-type is selected. Therefore, even if there is no instance, an access to OSI agent occurs at every access of SNMP manager.

In the present embodiment, it is possible to know whether or not the instance exist by once issuing GetRequest to obtaining the value, because of adding the object indicating which instance exists. Further, it is possible for SNMP manager to suppress an invalid access to the object having no instance.

An effect of a repetition number of a component of SEQUENCE OF-type and SET OF-type will be explained. When an attribute included in OSI management object and a component included in the attribute are SEQUENCE OF-type or SET OF-type, the attribute and its component are related to SNMP side table (intervalsOfDay in FIG. 25; first step side table). Further, a component included in SEQUENCE OF-type or SET OF-type is related to an object in an entry of the side table (intervalStart, intervalEnd in FIG. 25: second step side table). Herein, a repetition number of the component is related to a number of arrangement of the side table. Therefore, to know the repetition number, it is necessary for SNMP manager to repeatedly issue the last object in the entry and Get-NextRequest designating an index value plural times which is equal to the number of the arrangement in the entry.

In the present embodiment, it is possible to know the repetition number of the component by once issuing GetRequest, because of adding the object indicating the repetition number of the component.

An effect of a cache will be explained. A structural component (SEQUENCE-type etc.) included in OSI management object is related to an entry having two or more objects of SNMP side table. Therefore, in the case that SNMP manager obtains a value of a structural attribute of OSI management object, it is necessary to issue twice or more GetRequest or Get-NextRequest. If there is no cache, it is necessary to issue M-GETreq to OSI agent at every time when GetRequest or GetNextRequest is received.

In the present embodiment, when an access occurs to the structural attribute of OSI management object, the value first obtained is kept as a cache. Then, it is not necessary to issue M-GETreq to OSI agent at twice and more access Which continuously occur to the same structural attribute. Further, as a cache is independently allocated to every SNMP manager, any SNMP manager does not rewrite another SNMP manager's cache.

An effect of replica will be explained. A component of a structural attribute (SEQUENCE-type, etc.) included in OSI management object is related to an entry having two or more object of SNMP side table. Therefore, if there is no replica in obtaining a value of the structural attribute, it is necessary for SNMP manager to issue SetRequest designating all objects in the entry of the side table. Namely, it is impossible to partially set a certain value of only certain object.

In the present embodiment, as there is a replica of an attribute value, it is possible to supply a value except for a partial object designated to a request. As the result, it is possible to set a value which is designated only to a certain objet of the entry in the side table. Further, in the case that an access occurs to the attribute of OSI management object by GetRequest or Get-NextRequest from SNMP manger, it is not necessary to issue M-GETreq to OSI agent based on second or later access to same attribute which is a simple or structural type, because of keeping a value obtained by a first access.

An effect of a link object will be explained. When an attribute included in OSI management object and a component included in the attribute are a structural type (SEQUENCE OF, SET OF, SEQUENCE, SET, CHOICE), the attribute and its component are related to a side table of SNMP (WeekMask, intervalStart etc. in FIG. 25). Further, when a component of the structural attribute is a type in which a structural nest is repeated, the component is related to the multi-step side table. Therefore, it is necessary for SNMP manager to trace a pointer indicating a connection of the table from a top to an end of the table by issuing GetRequest or Get-NextRequest, so that SNMP manager gets an access to the end of the table. For example in FIG. 25, in case of obtaining a value of the object in third side table (hour or minute), four times of access are necessary by first access to obtain the value of pointer object (WeekMask) of the class table, second access to obtain the value of pointer object (intervalsDay) of first side table indicated by the value of WeekMask and third access to obtain the value of pointer object (intervalStart or intervalEnd) of second side table indicated by the value of intervalsDay.

In the present embodiment, when SNMP manager obtains the value of the attribute of OSI management object, if the link object of the attribute is requested by first GetRequest or first Get-NextRequest, it is possible, at a second or later access, to get an access directly to an entry object of all side tables by using an information of the link object obtained at first access. For example in FIG. 25, in the case that a link object is designated by first request obtaining the value of pointer object "WeekMask" of the class table, it is possible to get an access directly to the entry object "hour, minute" of third side table by a second request.

As mentioned-above, it is possible that an SNMP manager manages an OSI management agent by using a gateway apparatus of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gateway apparatus for SNMP/OSI management enabling an SNMP manager to manage an OSI management agent comprising:

SNMP protocol process means for giving and receiving a message by a simple network management protocol (SNMP) to/from the SNMP manager having the SNMP protocol as an interface, and for producing and analyzing a protocol data unit;

OSI protocol process means for giving and receiving a message by a common management information protocol (CMIP) to/from the OSI management agent having the OSI protocol as an interface, and for producing and analyzing a protocol data unit;

table means for determining a correspondence between a definition of OSI management information and a definition of SNMP management information;

instance information means for keeping a name tree of the OSI management agent;

conversion means for converting a management operation and the management information between the SNMP manager and the OSI management agent, said conversion means being connected with said SNMP protocol process means, said OSI protocol process means, said definition table means and said instance information means.

2. The apparatus claimed in claim 1 further comprising:

instance management means for renewing the name tree kept by said instance information means based on a result of the analysis by said OSI protocol process means.

3. The apparatus claimed in claim 1:

said conversion means having cache means corresponding to every SNMP manager;

when an attribute value is a structural type, said attribute value is kept in the cache means of said conversion means, and said attribute value is obtained by issuing a management operation of M-GETreq;

when a request of the SNMP manager is to obtain a management information corresponding to the attribute value kept in the cache means, the attribute value in the cache means is transferred.

4. The apparatus claimed in claim 3:

when the request of the SNMP manager is not to obtain a management information corresponding to the attribute value kept in the cache means, a content in the cache means is deleted.

5. The apparatus claimed in claim 3:

when the request of the SNMP manager is to set a management information, a content in the cache means is deleted.

6. The apparatus claimed in claim 3:

when an association between the OSI management agent and the gateway apparatus for SNMP/OSI management is disconnected, all contents in the cache means are deleted.

7. The apparatus claimed in claim 1:

said conversion means having replica means;

a copy of an attribute value is set in the replica means, wherein said attribute value is obtained by issuing a management operation of M-GETreq;

when a request of the SNMP manager is to set a management information corresponding to the attribute value in the replica means, a management operation M-SETreq is issued for changing a value of the requested part and for setting it as a management information in the OSI management agent;

when a request of the SNMP manager is to obtain a management information corresponding to the attribute value in the replica means, the attribute value in the replica means is transferred.

8. The attribute claimed in claim 7:

said attribute value is copied according to a request, an existence of said request being stored in said definition table means.

9. The apparatus claimed in claim 7:

when an association between the OSI management agent and the gateway apparatus for SNMP/OSI management is disconnected, all contents in the replica means are deleted.

10. The apparatus claimed in claim 7:

plural copies being allowed in the replica means, wherein the oldest copy is deleted when a number of the copies is more than a maximum.

11. The apparatus claimed in claim 10:

said oldest copy is periodically deleted by said conversion means based on expiration of a timer.

12. The apparatus claimed in claim 1:

said conversion means having link object means;

when a structural attribute of the management information of the OSI management agent is accessed, a structural data being generated as link object and said structural data being transferred as OPAQUE-type data to the SNMP manager, wherein said structural data represents a table structure which is converted and spread as a management information of SNMP from the structural attribute of the management information of OSI management and which includes a status of the table, index which can be used in the table, and a class structure of the table.

13. The apparatus claimed in claim 12:

said link object means being independently set in every management object class of OSI management information.

14. The apparatus claimed in claim 1:

said definition table includes an OPAQUE-type of SNMP management information item which is converted as SNMP management information definition from OSI management information definition by using OPAQUE-type.

15. The apparatus claimed in claim 14:

an attribute type of the OSI management information being a structural type, wherein when a type is recursively defined in components included in said structural type, said attribute is an OPAQUE-type of a single SNMP management information item.

16. The apparatus claimed in claim 14:

an attribute type of the OSI management information being a structural type, wherein a number of steps of a side table made by spreading the structural type is more than a predetermined number, said attribute is an OPAQUE-type of a single SNMP management information item.

17. The apparatus claimed in claim 1:

said definition table means includes, as an SNMP management information item to be converted, an object representing a number of instances of OSI managed objects.

18. The apparatus claimed in claim 1:

said definition table means includes, as an SNMP management information item to be converted, an object representing an existence of a conditional attribute in the OSI management information definition.

19. The apparatus claimed in claim 1:

said definition table means includes, as an SNMP management information item to be converted, an object representing an existence of a optional component in an attribute of SEQUENCE-type or SET-type in the OSI management information definition.

20. The apparatus claimed in claim 1:

said definition table means includes, as an SNMP management information item to be converted, an object representing a selection information of a component in an attribute of CHOICE-type in the OSI management information definition.

21. The apparatus claimed in claim 1:

said definition table means includes, as an SNMP management information item to be converted, an object representing a repetition number of a component in an attribute of SEQUENCE OF-type or SET OF-type in the OSI management information definition.

* * * * *